(12) United States Patent
Okamoto et al.

(10) Patent No.: US 8,761,282 B2
(45) Date of Patent: Jun. 24, 2014

(54) RECEIVER AND RECEIVING METHOD

(75) Inventors: Naoki Okamoto, Osaka (JP); Ryota Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 109 days.

(21) Appl. No.: 13/499,714

(22) PCT Filed: Oct. 20, 2010

(86) PCT No.: PCT/JP2010/068429
§ 371 (c)(1),
(2), (4) Date: Apr. 2, 2012

(87) PCT Pub. No.: WO2011/052439
PCT Pub. Date: May 5, 2011

(65) Prior Publication Data
US 2012/0201333 A1 Aug. 9, 2012

(30) Foreign Application Priority Data

Oct. 27, 2009 (JP) ................................ 2009-246051

(51) Int. Cl.
*H04K 1/10* (2006.01)
(52) U.S. Cl.
USPC ........... 375/260; 375/259; 375/316; 370/252; 370/253; 370/312; 370/390; 370/432
(58) Field of Classification Search
USPC .......... 375/260, 259, 316; 370/252, 253, 312, 370/390, 432
See application file for complete search history.

(56) References Cited

U.S. PATENT DOCUMENTS

| 6,078,412 | A | 6/2000 | Fuse et al. |
|---|---|---|---|
| 7,634,026 | B2 | 12/2009 | Tanaka et al. |
| 2006/0193394 | A1 | 8/2006 | Tanaka et al. |
| 2010/0183094 | A1 | 7/2010 | Shimezawa et al. |
| 2011/0141962 | A1* | 6/2011 | Kim et al. ..................... 370/312 |

FOREIGN PATENT DOCUMENTS

| JP | 9-98155 A | 4/1997 |
|---|---|---|
| JP | 10-242936 A | 9/1998 |
| JP | 2001-144664 A | 5/2001 |
| JP | 2003-244097 A | 8/2003 |

(Continued)

OTHER PUBLICATIONS

Kato, K. et al.: "Multipath Division Turbo Equalization with Block Inter-Carrier Interference Cancellation in Cellular System with Amplify-and-Forward Relaying", Proceedings of the IEEE 20th International Symposium on Personal, Indoor and Mobile Radio Communications, Sep. 13, 2009, pp. 2656-2660.

(Continued)

*Primary Examiner* — Zewdu Kassa
(74) *Attorney, Agent, or Firm* — Birch, Stewart, Kolasch & Birch, LLP

(57) ABSTRACT

Disclosed is a receiver in a communication system provided with one transmitting station or two or more transmitting stations and the receiver for reception from the transmitting stations. For a case where identical signals are sent from the one transmitting station or the two or more transmitting stations, the receiver includes a first demodulator which executes demodulation processing of the signals as a single signal group, a second demodulator which executes demodulation processing of the signals as multiple signal groups, a determination unit which discriminates between the single signal group and the multiple signal groups, and a control unit which controls which one of the first demodulator and the second demodulator is to execute the demodulation processing based on a determination result by the determination unit.

29 Claims, 19 Drawing Sheets

(56) References Cited

FOREIGN PATENT DOCUMENTS

| JP | 2004-165935 A | 6/2004 |
|---|---|---|
| JP | 2006-245702 A | 9/2006 |
| JP | 2007-36402 A | 2/2007 |
| JP | 2007-537613 A | 12/2007 |
| WO | WO 2009/001853 A1 | 12/2008 |

OTHER PUBLICATIONS

Shimezawa, K. et al.: "A Novel SC/MMSE Turbo Equalization for Multicarrier Systems with Insufficient Cyclic Prefix", Proceedings of the IEEE 19th International Symposium on Personal, Indoor and Mobile Radio Communications, Sep. 15, 2008, pp. 1-5.

* cited by examiner

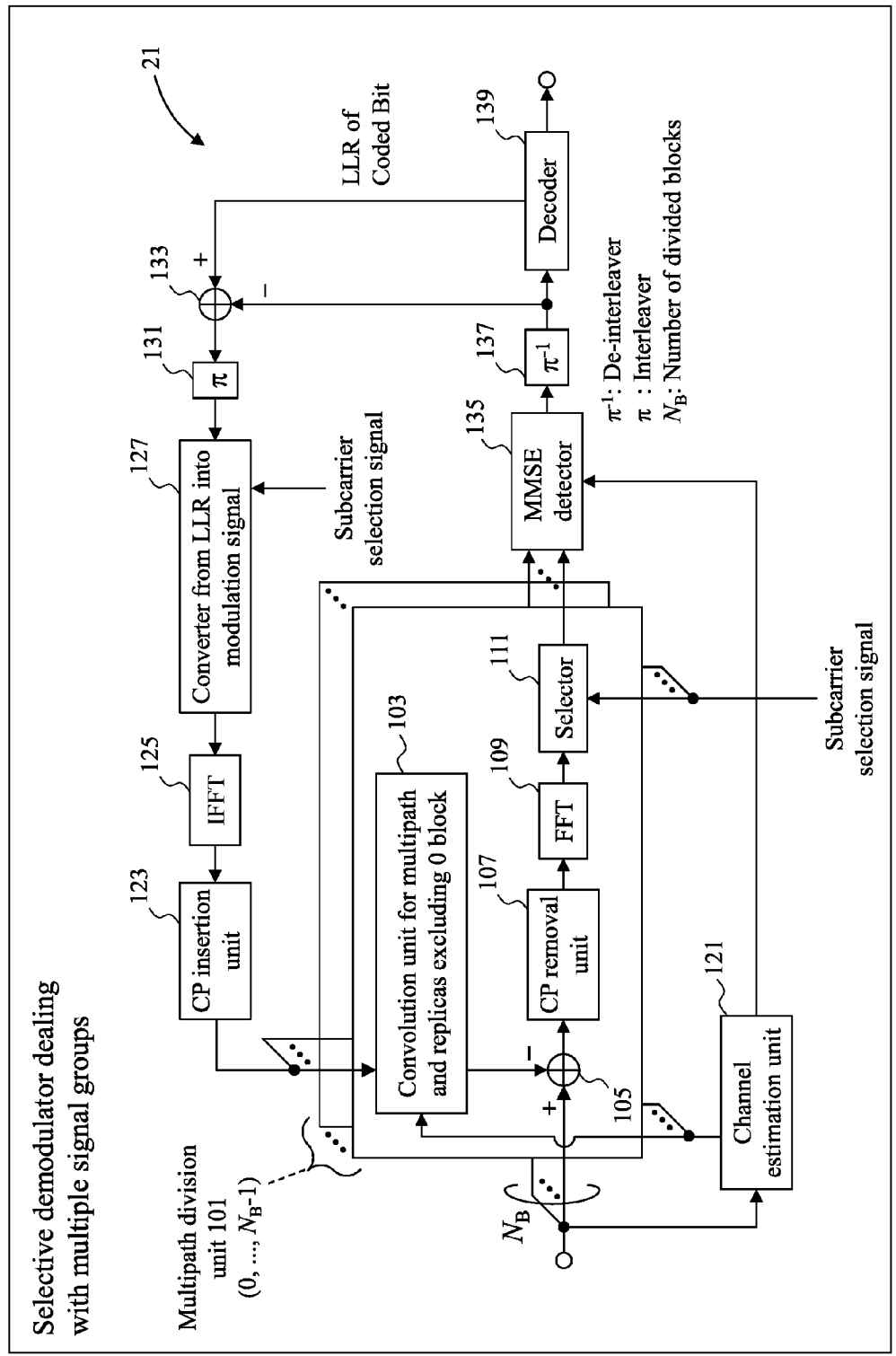

Overhanging antennas

Attenuation by transmission and long-distance reflection

▲Four-channel wideband digital repeater application

RECEIVER AND RECEIVING METHOD

TECHNICAL FIELD

The present invention relates to a reception technique for communication, or more specifically, to a radio communication technique which enables large capacity transmission by using spatial multiplexing and involves an auxiliary device (such as a repeater) in addition to a base station acting as a hub.

BACKGROUND ART

In one method for a radio communication system such as a radio communication system involving cellular telephones and the like, the system includes base stations installed in high positions and mobile stations, a service area having a radius of about 1 km, for example, is allocated to one base station, and the base stations and the mobile stations communicate with each other.

However, radio waves hardly reach shielded locations due to straightness, and also are subjected to propagation attenuation, thereby creating out-of-service (so-called no service) areas. Installation of a repeater (also called a booster) is proposed as a technique for avoiding such a problem. FIG. 14 is a view showing a configuration example of a system including such a repeater station.

FIG. 14 is the view shown in Non-patent Document 1 cited below, in which a service area is secured by a repeater that receives a signal from a base station (AP) by an antenna ATA1 and emits radio waves from an antenna ATM1 for a mobile station MT to a mountain area which is out of service. While this example depicts the mountain area, installation of repeaters in an urban area having many areas behind buildings and the like has been considered as well in recent years, because the straightness of the radio waves is strengthened due to a shift of the band frequency available for radio communication to a higher frequency band (from a conventional band of 800 MHz to a band of 2 GHz or 4 GHz, for example). FIG. 15 illustrates views showing such an example, in which FIG. 15(a) shows a configuration without a repeater and FIG. 15(b) shows a configuration with a repeater. An area which the radio waves can hardly reach because of a building or the like (a weak electric field area behind a building) emerges in the case without a repeater. Accordingly, the electric field intensity of an area behind a building can be increased by installing a repeater for the area behind the building as shown in FIG. 15(b).

PRIOR ART DOCUMENT

Non-Patent Documents

Non-patent Document 1: NTT Docomo Journal Vol. 15, No. 1, p. 31
Non-patent Document 2: Technical Committee on RCS 2009-7, The Institute of Electronics, Information and Communication Engineers

SUMMARY OF THE INVENTION

Problems to be Solved by the Invention

However, even though use of a repeater leads to an increase in the electric field, a signal delay may be caused. This example will be described with reference to FIG. 16. FIG. 16(a) is a view showing an example of a configuration of a radio communication system including a base station AP, a terminal MT, and a repeater RT. Here, let's consider a terminal reception signal C1 not routed through the repeater RT and a terminal reception signal C2 routed through the repeater. The signal C1 is a wave directly coming from the base station while the signal C2 is a wave coming through the repeater. In terms of reception signal characteristics at a mobile station terminal shown in FIG. 16(b), the horizontal axis indicates the time and the vertical axis indicates received power.

Usually, arriving waves temporally spread due to inclusion of waves arriving later due to influences of reflectors such as buildings, but have very little delay attributed to the reflection. Hence only a route difference for arrival causes such a delay and a spread of the delay is relatively small because the waves are propagated at the speed of light.

On the other hand, the route through the repeater involves, as internal circuits, circuits such as frequency conversion units, filters, and amplifiers for amplifying signals. For this reason, a relatively large delay occurs in the repeater circuit. This example is shown in FIG. 19. FIG. 19 shows a configuration example of a repeater for digital processing, in which each line includes two IF filters, three amplifiers, an ADC, a DAC, and digital filters. Such an internal circuit causes a delay. Accordingly, as shown in FIG. 19, a signal arrives slightly later than a base station signal that arrives directly like a group of two temporally separated signals.

In the environment as shown in FIG. 14, a region where radio waves are weak is a physically isolated area. Accordingly, C2 is greater than C1 and there is a difference between the signals from the base station and the repeater. However, in the environment as shown in FIG. 15, it is difficult to distinguish an area of the base station from an area of the repeater and there may be a case where both of the signals from the base station and the repeater enter a terminal with signal strengths at comparable levels depending on the location of the terminal. This causes a phenomenon in which the same signals at the comparable levels are received with a slight delay by the terminal as shown in FIG. 16. When the signal is delayed as described above, the CDMA scheme of the current third-generation system, for example, can separate the signals in the delayed signal group per chip that is a unit of modulation of spread codes regarding the delayed signal group. Accordingly, a rake reception technique and the like do not allow delayed waves to cause a problem of a reception characteristic.

Meanwhile, the OFDM is also configured to add guard interval signals as a countermeasure for delayed waves. Thus, a normal delay attributed to multiple reflection or the like does not cause any problem in the reception characteristic, but a large delay, if present as shown in FIG. 16, causes a problem of characteristic degradation. Accordingly, there has been proposed a method of improving the characteristic by processing such a delayed wave in OFDM communication.

FIG. 17 is a functional block diagram showing an example of a circuit configuration for performing the above-mentioned processing. The structure shown in FIG. 17 is configured to eliminate an interference of a signal delayed beyond the guard interval of the OFDM by processing the signal, which is temporally delayed with respect to an inputted signal, by using a different functional block.

Signals inputted to the circuit shown in FIG. 17 are divided into a signal group coming from a base station and a signal group coming from a repeater by use of a multipath division unit 301 and then processed (subjected to division processing into C1 and C2 blocks in FIG. 16). A device shown in FIG. 17 includes a GI adder 313, an IFFT unit 315, a symbol generator 321, an IL (interleaver) 323, an adder 325, a MMSE filter 317, a demodulator 327, a De-IL (de-interleaver) 331, a decoder 335, and a channel estimation unit 311.

A method called turbo equalization is used to remove an interference component from decoded signals. By iterating [demodulation, generation of a replica of a delayed signal (such as the signal group C2 from the repeater in FIG. 16) causing the interference, removal of a C2 signal component, and redemodulation of the signal after removing the interference], it is possible to separate the signals gradually into the C1 or C2 signal component only, and eventually to demodulate the signals separately. Therefore, the above-described problem due to the delayed wave can be solved by eliminating the delayed signal beyond the guard interval (a MD-TE method). An example of characteristics in this case is shown in FIG. 18. A difference in the characteristic depending on the presence of the separation is evident and the difference is large in the case of a high modulation index representing high-speed transmission.

The above-described technique can solve the delay attributed to the repeater in this way, but still has a problem of a processing delay due to repeated processing, a problem of a large circuit scale, and so forth.

An object of the present invention is to provide a communication circuit that offers appropriate processing even in an environment where a delayed signal attributed to a repeater or the like is present.

Means for Solving the Problem

According to an aspect of the present invention, there is provided a receiver in a communication system provided with one transmitting station or two or more transmitting stations and the receiver for reception from the transmitting stations. For a case where identical signals are sent from the one transmitting station or the two or more transmitting stations, the receiver includes a first demodulator configured to execute demodulation processing of the signals as a single signal group and a second demodulator configured to execute demodulation processing of the signals as multiple signal groups, a determination unit configured to discriminate between the single signal group and the multiple signal groups, and a control unit configured to control which one of the first demodulator and the second demodulator is to execute the demodulation processing based on a determination result by the determination unit. In this way, it is possible to switch between reception of the single signal group and reception of the multiple signal groups depending on the condition of reception. Specifically, in reception where the single signal group and the multiple signal groups are mixed in some use environments and propagation conditions, it is determined whether to operate the reception system as reception of the single signal group or as reception of the multiple signal groups, and the reception system is controlled to properly receive the signals through different demodulation processing.

Meanwhile, there is provided a receiver in a communication system provided with one transmitting station or two or more transmitting stations and the receiver for reception from the transmitting stations. When identical signals are sent from the one transmitting station or the two or more transmitting stations and are separable and distinguishable as multiple signal groups including two or more groups by a reception system based on a difference in arrival time, the receiver includes a first demodulator configured to execute demodulation processing of the signals as a single signal group in the reception system, a second demodulator configured to execute demodulation processing of the signals as multiple signal groups separable based on the difference in arrival time, a determination unit configured to determine whether received signals are the single signal group or the multiple signal groups separable and distinguishable based on the difference in arrival time, a control unit configured to control which one of the first demodulator and the second demodulator is to execute the demodulation processing based on a determination result by the determination unit, and a selective demodulator configured to switch between reception of the single signal group and reception of the multiple signal groups depending on a state of reception. The demodulator capable of performing separate demodulation processing with two or more frequency regions into which a demodulation band frequency for the demodulator is divided is preferably configured to be capable of switching between reception of the single signal group and reception of the multiple signal groups based in units of the frequency regions. Meanwhile, in a case where a transmission signal includes a transmission signal dividable by frequency, the receiver preferably switches the demodulation band frequency in units of the frequency division processing of the transmission signal. The receiver preferably switches the frequency division processing based in units of frequency division processing of OFDMA in communication using an OFDMA method. The receiver preferably switches the demodulation band frequency based in units of processing of one signal including error correction.

The determination unit preferably measures an incoming received signal group, compares the reception single group with a preset threshold, and determines whether the received signal group is a single transmission group or multiple transmission groups. In this case, the threshold is preferably set depending on a modulation method used by a transmission signal. The threshold is set depending on the modulation method (the degree of multilevel modulation, an error correction method) used by the transmission signal. Meanwhile, the threshold may be set depending on demodulation performances of reception of the single signal group and reception of the multiple signal groups by a reception circuit. Or the threshold may be set depending on demodulation performances of reception of the single signal group and reception of the multiple signal groups by a reception circuit and on a demodulation performance of the receiver in motion.

In the receiver, when the two or more transmitting stations include one transmitting station and a repeater and transmit two or more identical signals in such a way that the repeater amplifies and transmits a received signal, the repeater preferably adds, as an additional signal, a signal enabling discrimination between the identical signals, and the receiver preferably discriminates between a single transmission group and multiple transmission groups based on whether or not the signal enabling determination is received. Meanwhile, the receiver preferably a function to receive the additional signal transmitted at least in any of a different band frequency and a different communication method from those of a relayed signal. Or the receiver preferably has a function to receive the additional signal multiplexed on the same frequency band as a relayed signal. Or the receiver preferably has a function to receive the additional signal transmitted while being added to outside of a frequency band of a relayed signal by the same demodulation method. The determination unit preferably performs determination based on a signal added as information data on the signal from the transmitting station. Meanwhile, the determination unit preferably performs determination by using a signal from an application layer. The switching is preferably performed by recognizing an input of a signal generated by the application layer as a user interface. This case represents the method of performing determination by recognizing that the user is located in a repeater area and switching the terminal to an indoor repeater mode or the like as the user interface. The terminal may also perform determination automatically by using a signal of some sort which notifies a location inside the repeater area.

Meanwhile, the control unit preferably performs switching control of the demodulation processing between reception of the single signal group and reception of the multiple signal groups and sets parameters of reception of the multiple signal groups. Meanwhile, the control unit preferably performs control by switching an operation clock used for the demodulation processing depending on a demodulation mode of either reception of the single signal group or reception of the multiple signal groups.

The control unit preferably controls a synchronization unit used for the demodulation processing of either reception of the single signal group or reception of the multiple signal groups and transmits synchronization signals that are different between reception of the single signal group and reception of the multiple signal groups. Or the control unit may control a gain calculation unit used for the demodulation processing of either reception of the single signal group or reception of the multiple signal groups depending on a demodulation mode. Or the control unit may perform calculation while switching reception quality depending on a demodulation mode in response to the switching control of the demodulation processing. Or the control unit may perform calculation while switching modulation information including a modulation mode and a code rate, depending on a demodulation mode in response to the switching control of the demodulation processing. Or the control unit may perform control while switching an antenna synthesis circuit depending on a demodulation mode in response to the switching control of the demodulation processing. Further, the control unit may input information corresponding to a demodulation mode as information provided to an application layer.

According to another aspect of the present invention, there is provided a receiving method in a communication system provided with one transmitting station or two or more transmitting stations and a receiver for reception from the transmitting stations. When identical signals are sent from the one transmitting station or the two or more transmitting stations, the method includes a determining step of discriminating between a single signal group and multiple signal groups, and a step of controlling which one of a first demodulating step and a second demodulating step to execute, on the basis of a determination result in the determining step, the first demodulating step being for demodulating the signals as a single signal group, the second demodulating step being for demodulating the signals as multiple signal groups. The present invention may also be a program for causing a computer to execute the above-described receiving method or a computer-readable recording medium recording the program. Meanwhile, the program may be acquired by a transmission medium such as the Internet.

This disclosure incorporates the contents of the specification and/or the drawings of Japanese. Patent Application No. 2009-246051 which forms the basis of priority of this application.

Effects of the Invention

As described above, according to the present invention, in reception in the case where a single signal group and multiple signal groups are mixed depending on a use environment and a propagation condition, signals can be properly received by determining whether it is appropriate to operate a reception system as reception of the single signal group or as reception of the multiple signal groups, and performing control as well as different demodulation processing. Moreover, it is possible to provide a receiver which can perform appropriate reception under various circumstances, and thereby to improve operation performances including a reception performance, power consumption, a processing delay, and so forth.

BRIEF DESCRIPTION OF THE DRAWINGS

FIG. 8 is a view showing an example of respective internal structures of the selective demodulator 21 dealing with multiple signal groups in FIG. 6.

Figure 1:
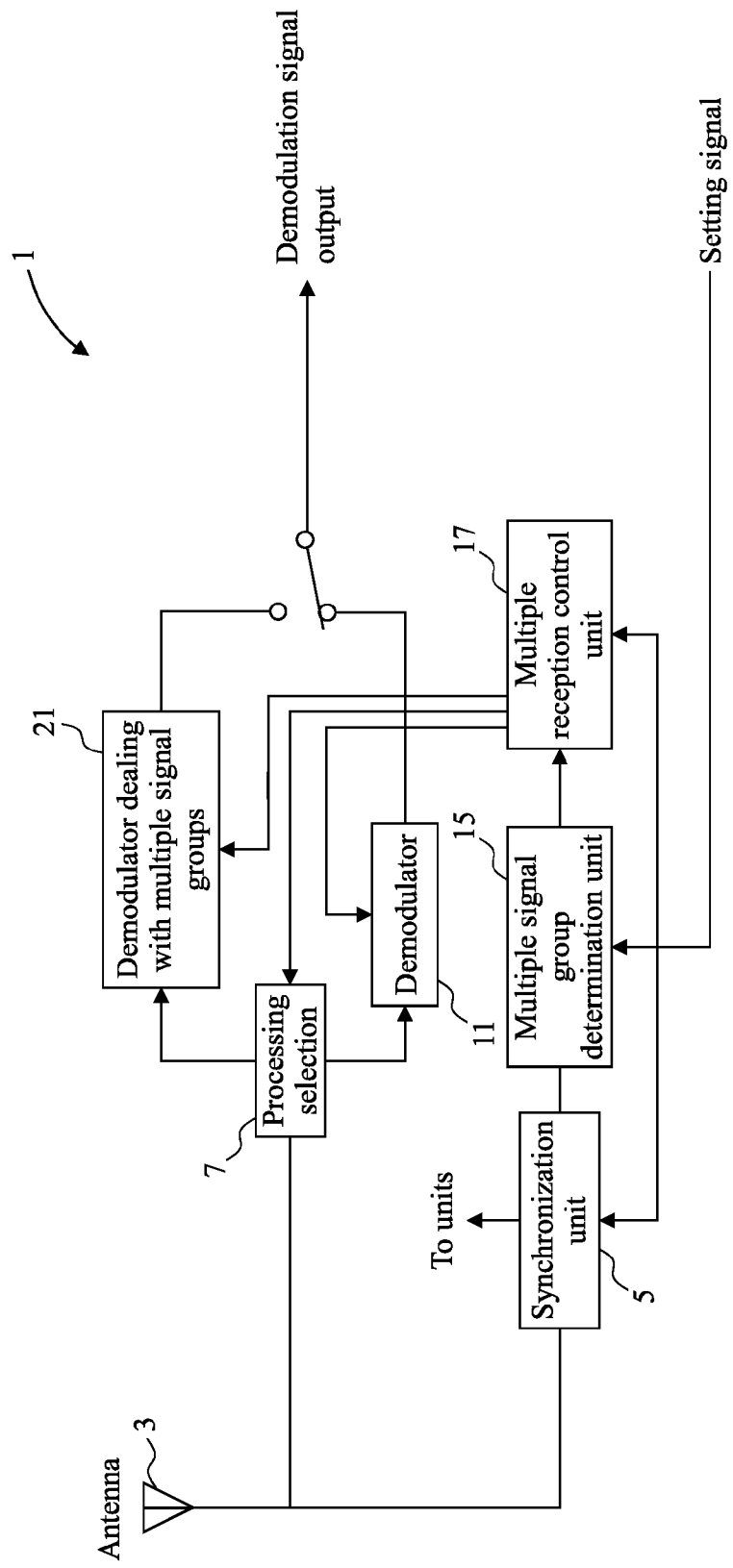
FIG. 1 is a functional block diagram showing only related portions in a reception system in an embodiment of the present invention.

EXPLANATION OF REFERENCE NUMERALS 1 receiver
3 antenna
5 synchronization unit
7 processing selector
11 demodulator
15 multiple signal group determination unit
17 multiple reception control unit
21 demodulator dealing with multiple signal groups
31 multipath division unit
45 GI adder
47 IFFF unit
51 symbol generator
53 IL (interleaver)
55 adder
57 channel estimation unit
61 MMSE filter
63 demodulator
65 de-interleaver
67 decoder

MODES FOR CARRYING OUT THE INVENTION

A communication technique according to an embodiment of the present invention will be described below with reference to the accompanying drawings.

First Embodiment

To begin with, a first embodiment of the present invention will be described. FIG. 1 is a view showing only related portions (a receiver 1) in a reception system in the embodiment of the present invention. A signal received at an end of an antenna 3 is synchronized by a synchronization unit 5. Then, a multiple signal group determination unit 15 determines whether the received signal is supposed to be processed as a single signal group or, supposed to be processed as multiple signal groups or as how many signal groups, and so forth. Thereafter, a multiple reception control unit 17 performs control to carry out different types of processing depending on whether normal demodulation processing for the single signal group or demodulation processing for the multiple signal groups should take place.

A processing selector 7 performs selection based on the control signal as to whether normal demodulation processing (a first demodulator: a demodulator 11) or demodulation processing dealing with a repeater (a second demodulator: a demodulator 21 dealing with multiple signal groups) is to be performed on the received signal, and performs the most appropriate processing. Note that the following description is given of a case where the first demodulator (the demodulator 11) and the second demodulator (the demodulator 21 dealing with multiple signal groups) function as different circuits. However, the invention is not necessarily limited to the case of including two independent circuits. It is needless to say that a case where the same circuit has both of the functions is also encompassed by the present invention.

Figure 2:
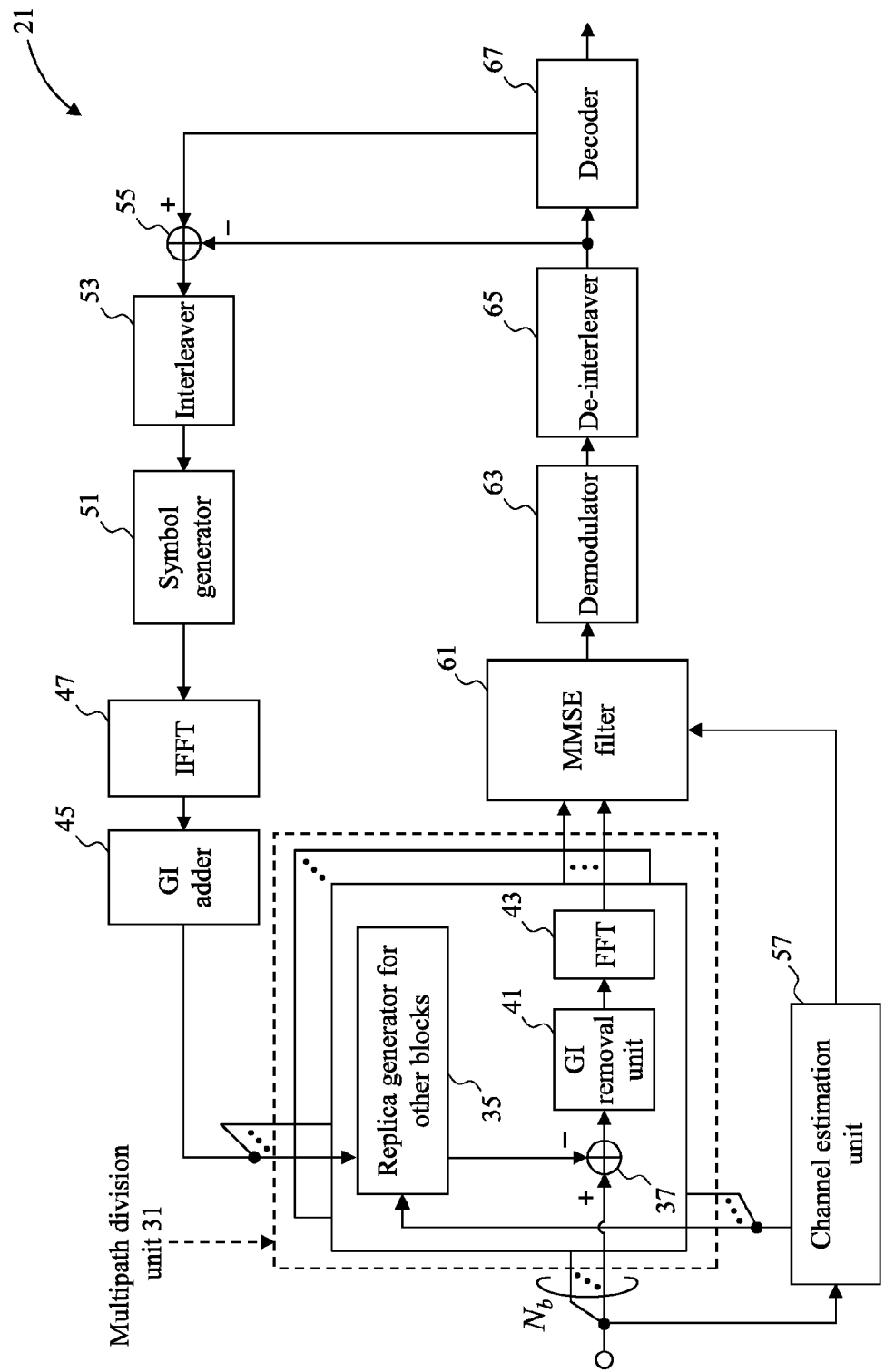
FIG. 2 is a functional block diagram showing an example of a structure of a demodulator dealing with multiple signal groups.
Figure 17:
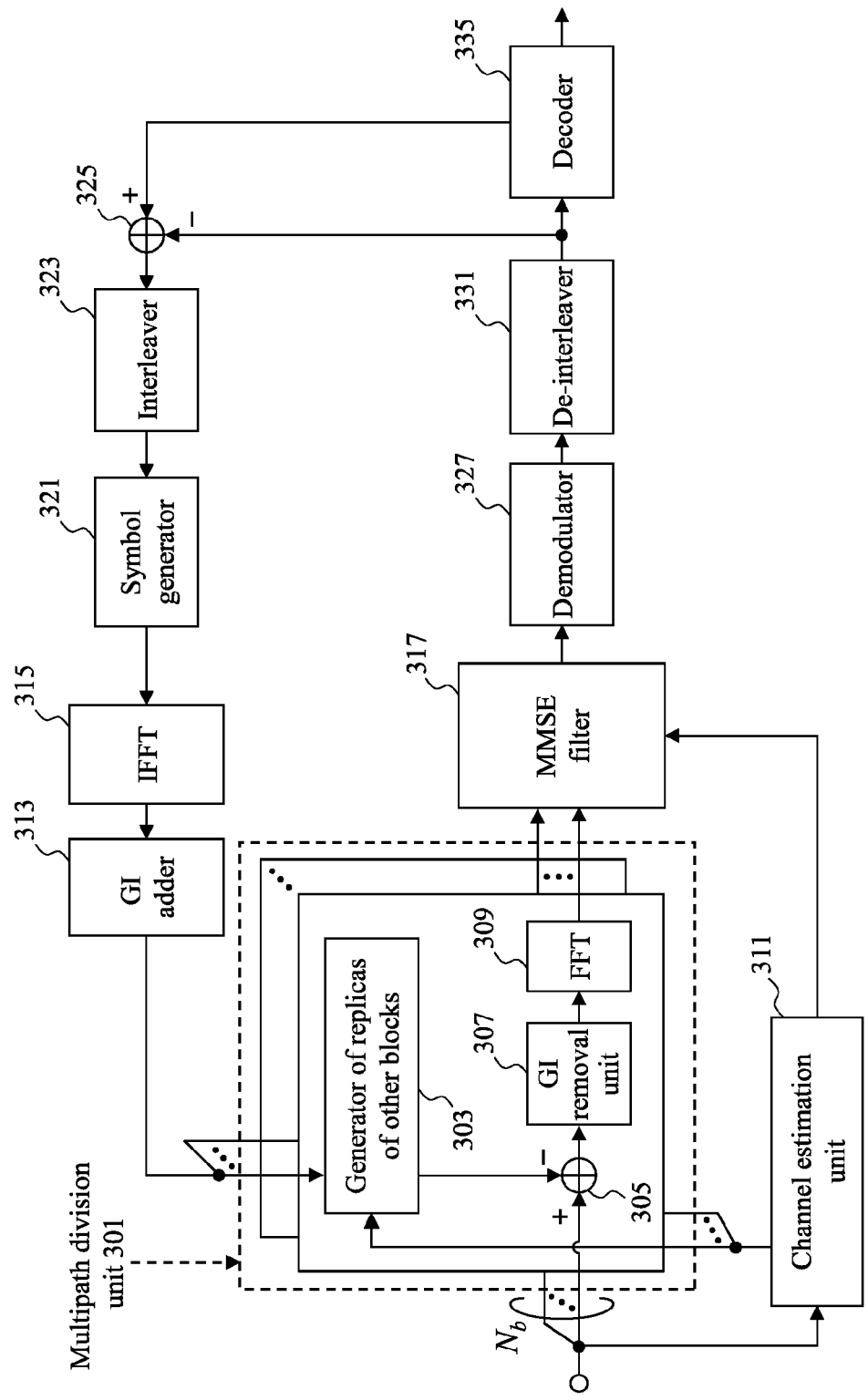
FIG. 17 is a view showing an example of a circuit configuration designed to eliminate an interference of a signal exceeding a guard interval of the OFDM by processing a signal temporally delayed with respect to an inputted signal by using a different functional block.
Figure 18:
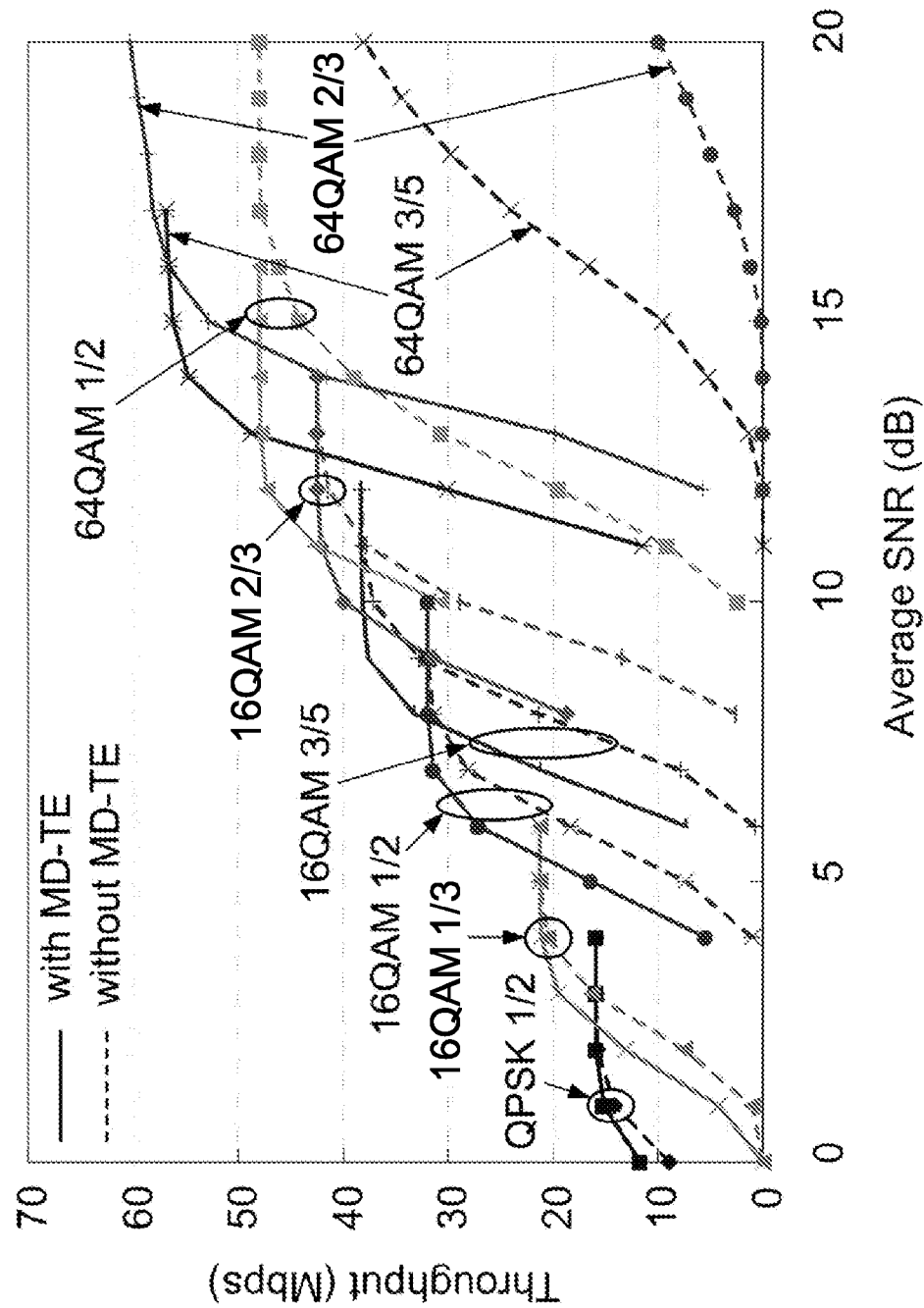
FIG. 18 is a view showing an example of characteristics (of a ME-TE method) which can solve a problem of a delayed wave.
Figure 19:
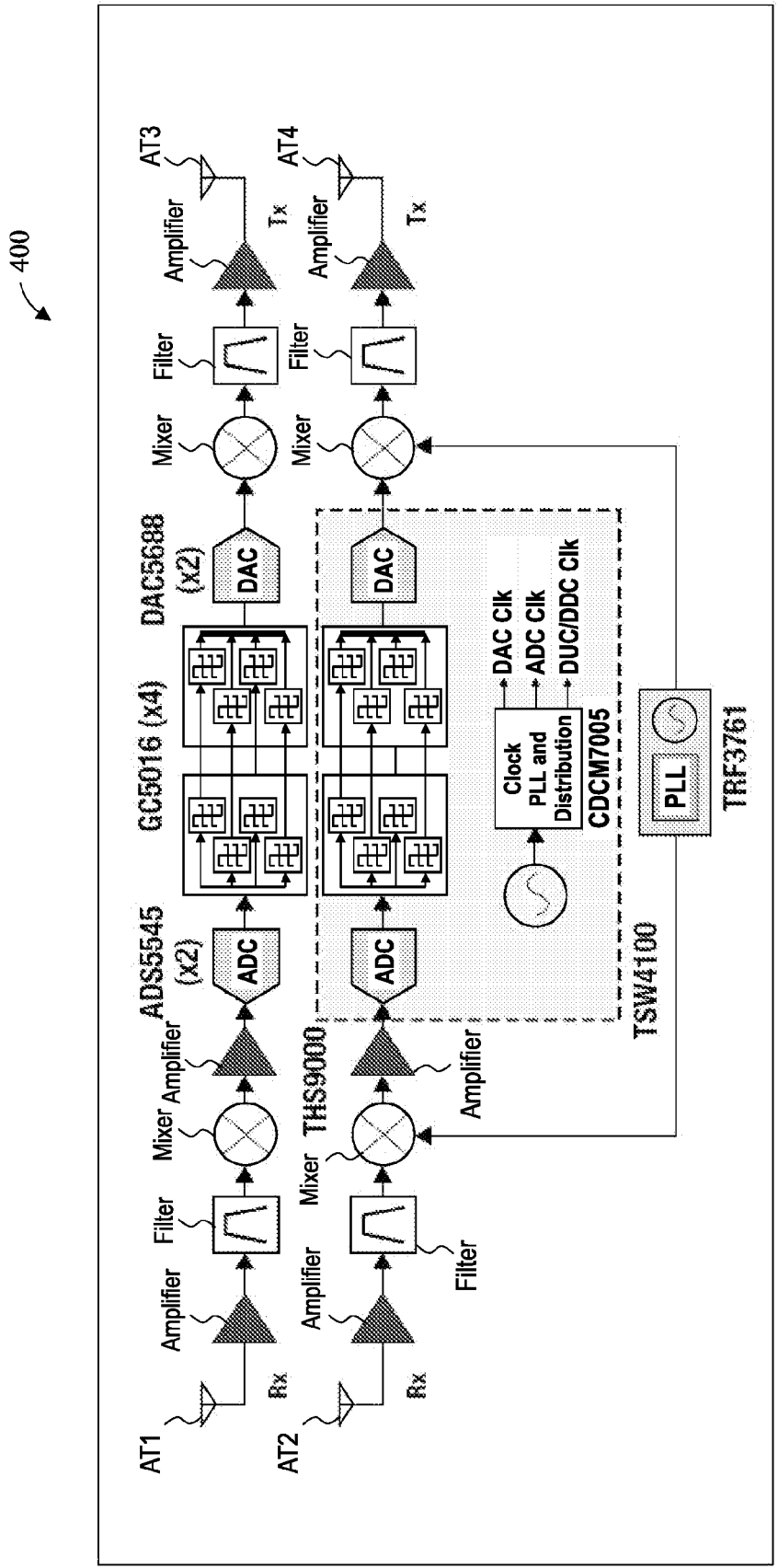
FIG. 19 is a view showing a configuration in which there are circuits including frequency conversion units, filters, amplifiers for amplifying signals, and the like in the case of routing through a repeater.

FIG. 1 shows an example in which the demodulator 21 dealing with multiple signal groups applies the configuration exemplified in the block diagram of the MD-TE having a similar configuration to FIG. 17 as illustrated in FIG. 2 shown in conjunction with the conventional example. However, even a different type of the demodulator dealing with multiple signal groups has the same configuration as FIG. 1 and can obtain a similar effect as long as the demodulator has processing provided with "a means for preventing degradation by interference in an environment where a base station wave and a delayed wave such as a repeater wave are present". The demodulator 21 dealing with multiple signal groups shown in FIG. 2 performs processing by separating a signal group coming from a base station from a signal group coming from a repeater by use of a multipath division unit 31. The device shown in FIG. 2 includes a GI adder 45, an IFFT unit 47, a symbol generator 51, an IL (interleaver) 53, an adder 55, a MMSE filter 61, a demodulator 63, a De-IL (de-interleaver) 65, a decoder 67, and a channel estimation unit 57.

Figure 3:
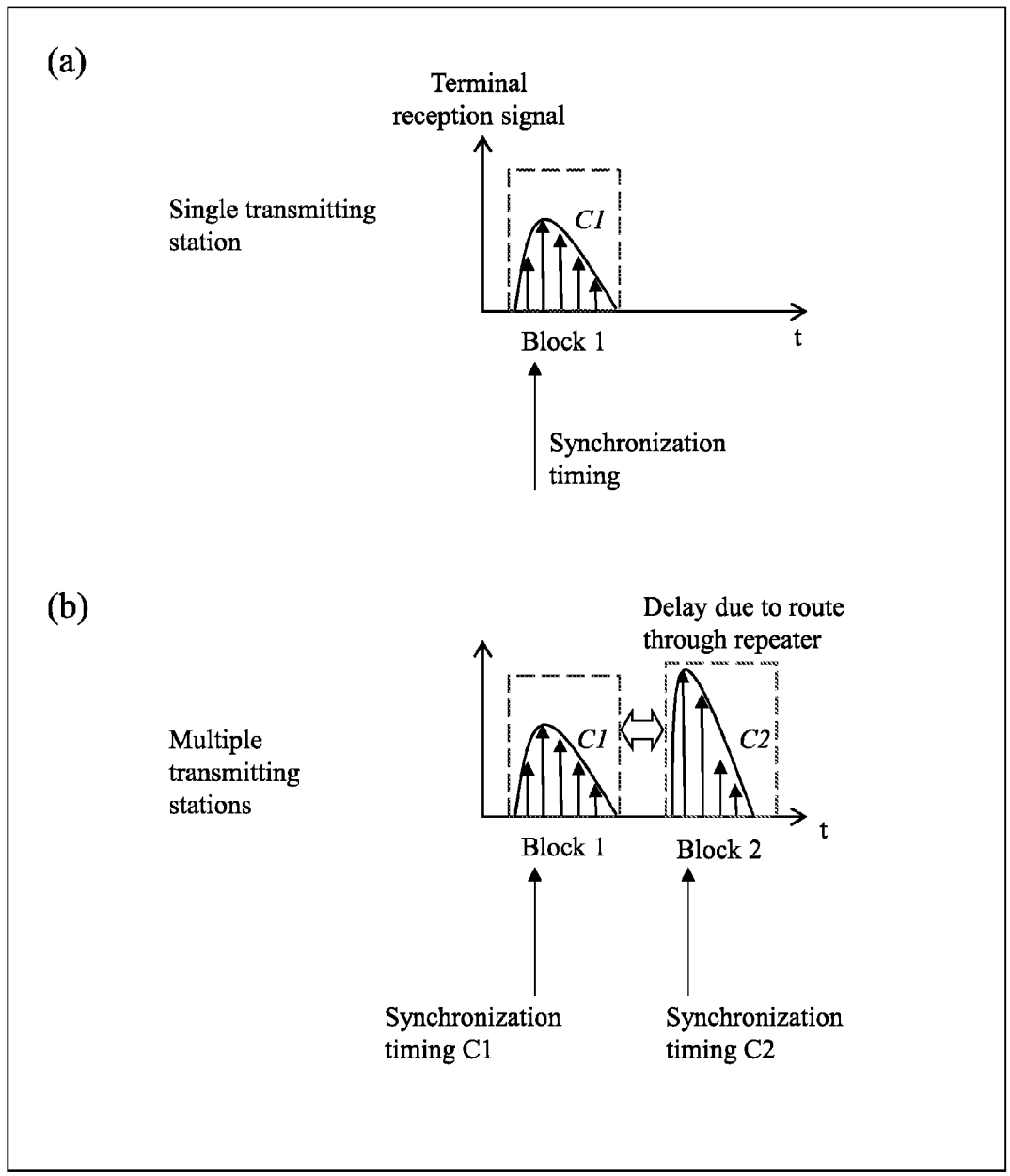
FIG. 3(a) is a view of a normal signal without a repeater or the like and FIG. 3(b) is a view of an example in which two signals C1 and C2 are coming in and a synchronization circuit synchronizes the two signals as well.

In the following, specific actions of the respective units in FIGS. 1 and 2 will be described below. First, the synchronization unit 5 will be described. The function of the synchronizer in a communication apparatus is to correctly operate a demodulation system in synchronization with a timing for demodulating a signal. This point will be described with reference to FIG. 3. FIG. 3(a) shows a normal signal without a repeater or the like for which synchronization often takes place at a synchronization timing illustrated in the drawing (synchronization is carried out at the point of the highest power in this case). Here, propagation path estimation is also carried out.

However, two signals C1 and C2 come in as reception signals in this embodiment. Accordingly, a synchronization circuit also synchronizes the two signals as shown in FIG. 3(b). The two signals are the signals that pass through mutually different propagation paths. Hence the most appropriate synchronization timing can be determined independently based on the highest point of the power in terms of each of the signals C1 and C2. In the meantime, although it is not illustrated in the drawing, the synchronization timing is aligned with the signal C2 when the radio wave from the repeater station is dominant.

While the way of a decision of the synchronization timing as described above may be determined by the synchronization circuit itself, it is also possible to control such a decision together with the multiple signal group determination unit 15 that follows the circuit.

Figure 14:
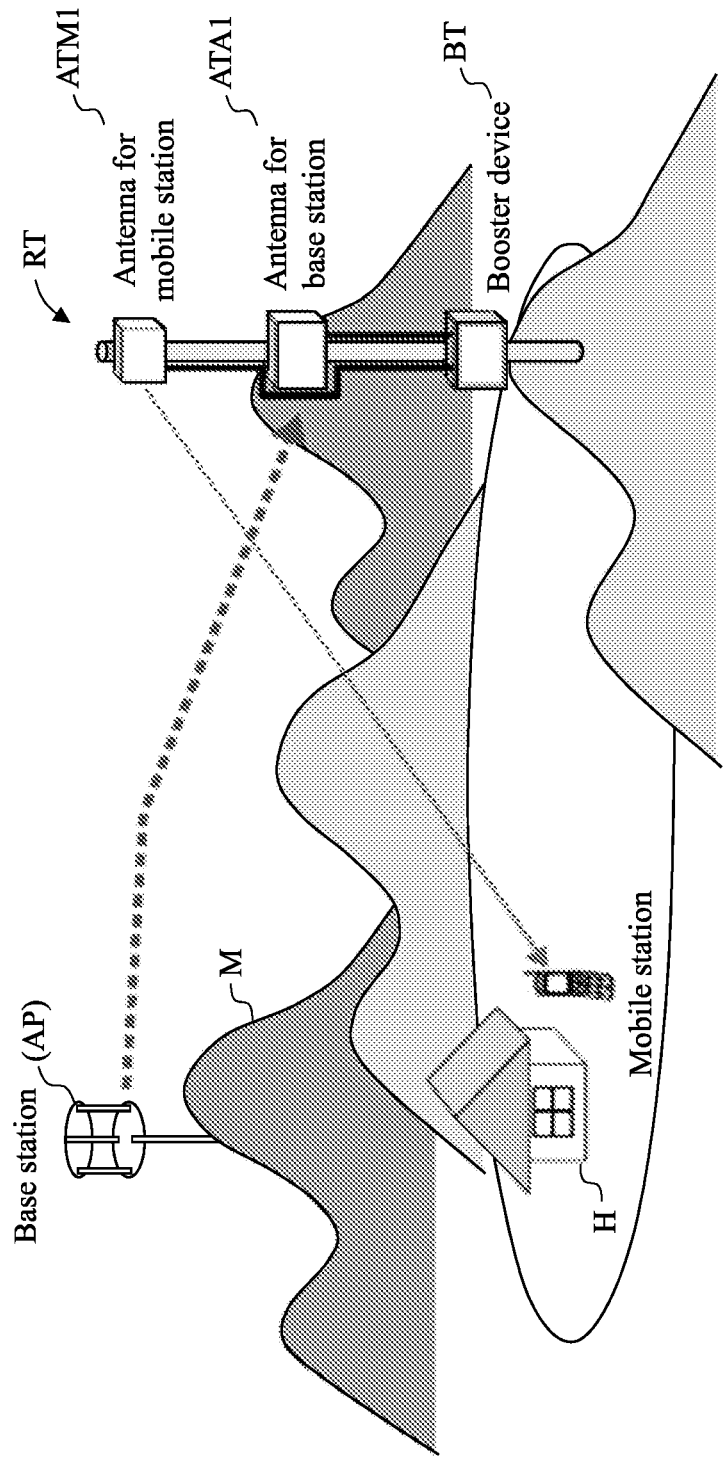
FIG. 14 is a view shown in Non-patent Document 1, in which an antenna ATA1 of a repeater RT receives a signal from a base station (AP) and radio waves are emitted from an antenna ATM1 for a mobile station MT to a mountain area, which is out of service, in order to secure a service area.
Figure 15:
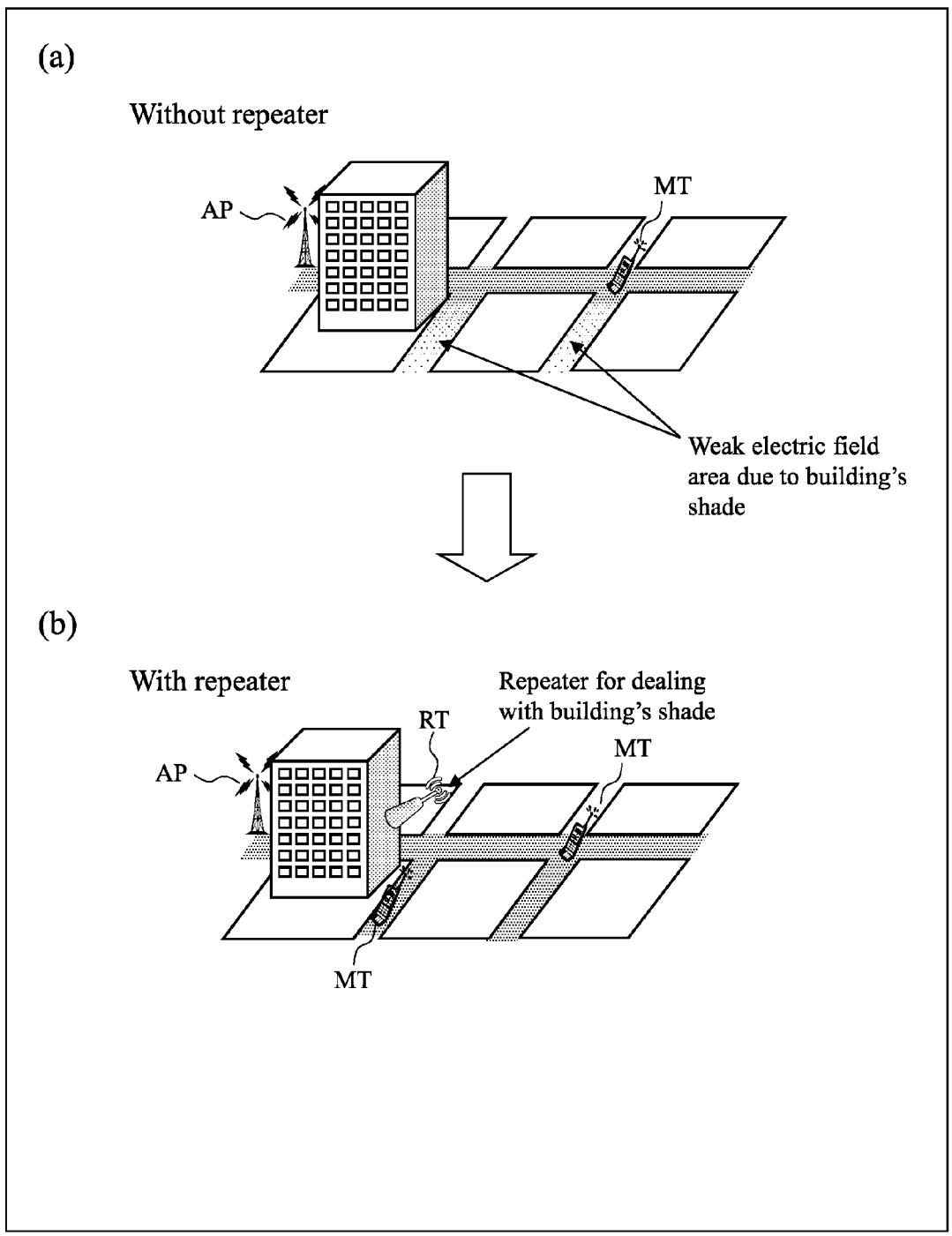
FIG. 15(a) is a view showing a configuration without a repeater and FIG. 15(b) is a view showing a configuration with a repeater.
Figure 16:
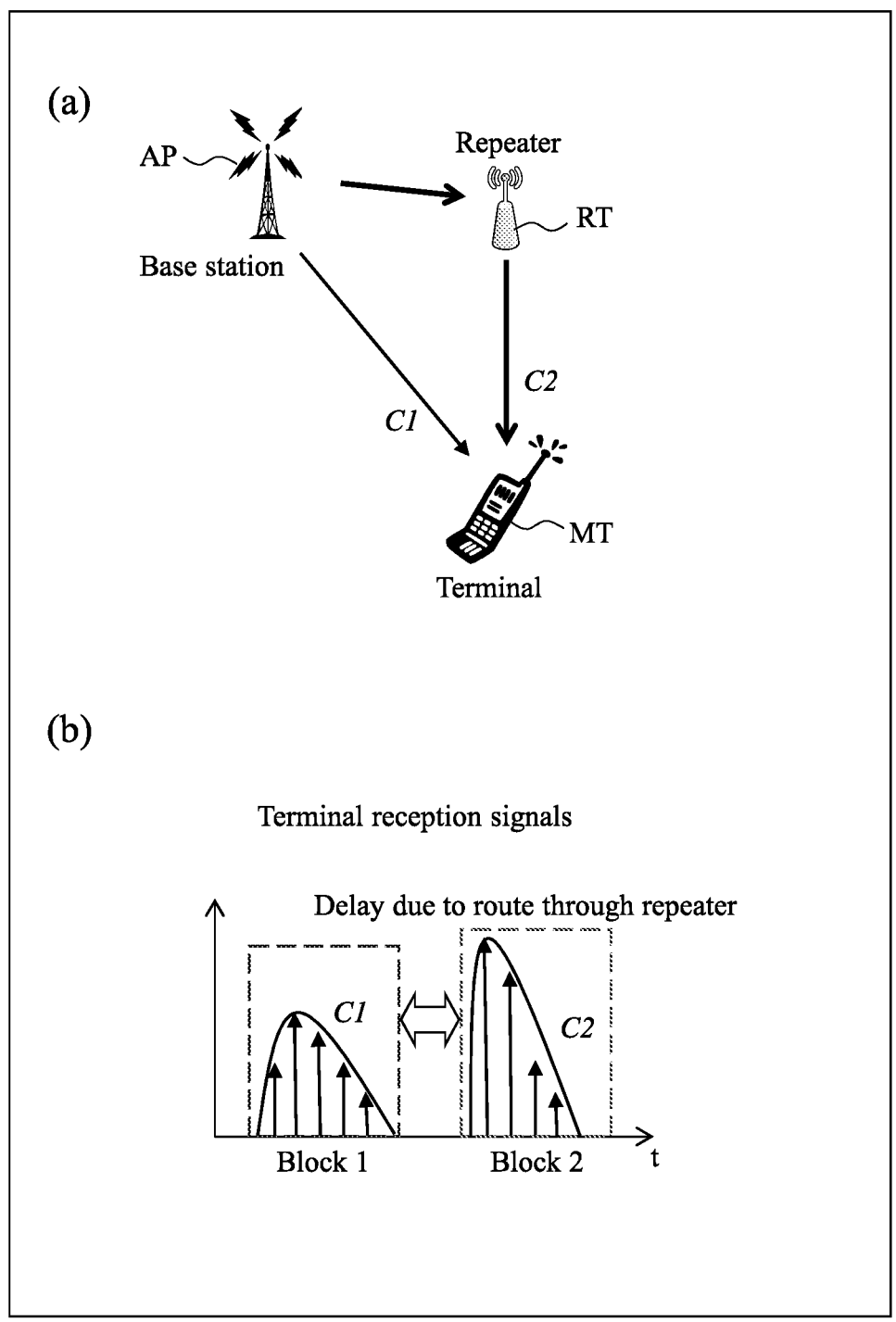
FIG. 16(a) is a view showing an example of a configuration of a radio communication system including a base station AP, a terminal MT, and a repeater RT, in which a terminal reception signal C1 not routed through the repeater RT and a terminal reception signal C2 routed through the repeater are considered. The signal C1 is the wave directly reaching from the base station while the signal C2 is the wave routed through the repeater. In terms of reception signal characteristics at a mobile station terminal shown in FIG. 16(b), the horizontal axis indicates the time and the vertical axis indicates received power.

Next, the multiple signal group determination unit 15 will be described. The multiple signal group determination unit 15 performs determination according to a result of the synchronization processing by the synchronization unit 5 as to whether the signal received from the channel estimation unit 57 should be processed as a single signal group or as multiple signal groups, and changes the processing by the demodulation system depending on a result of determination. In this example, the multiple signal group determination unit 15 determines whether the signal includes two signal groups of the signal C1 and C2, for example, or the signal consists either of the signal C1 or of the signal C2. Specifically, when description is made on the basis of the configurations shown in FIG. 14 and FIG. 15 as examples, only the signal C1 is received and determined as a single transmitting station in a place where only the signal from the base station can be received. Thus processing for reception as the single signal group is performed. Meanwhile, the signal C2 is received and determined as a single transmitting station in a place where only the signal from the repeater can be received because the direct radio wave from the base station is weak. Hence the synchronization is aligned with the signal C2 and the signal from the repeater is defined as the single signal group and is subjected to demodulation processing.

On the other hand, in a place where both of the radio waves from the base station and the repeater station can be received, the radio waves C1 and C2 are received and determined as signal reception from multiple transmitting stations. Hence the processing is performed for the multiple signal groups. In this case, a synchronization system also sends out two synchronization signals in the example shown in this drawing.

However, the signals are not limited only to these three patterns and there may also be a case where one of the signals is weak while the other is strong. In this case, a power difference between the two is compared with a threshold as a criterion in order to control as to whether the signals should be subjected to the reception processing as the single signal group or to the reception processing as the multiple signal groups.

Figure 4:
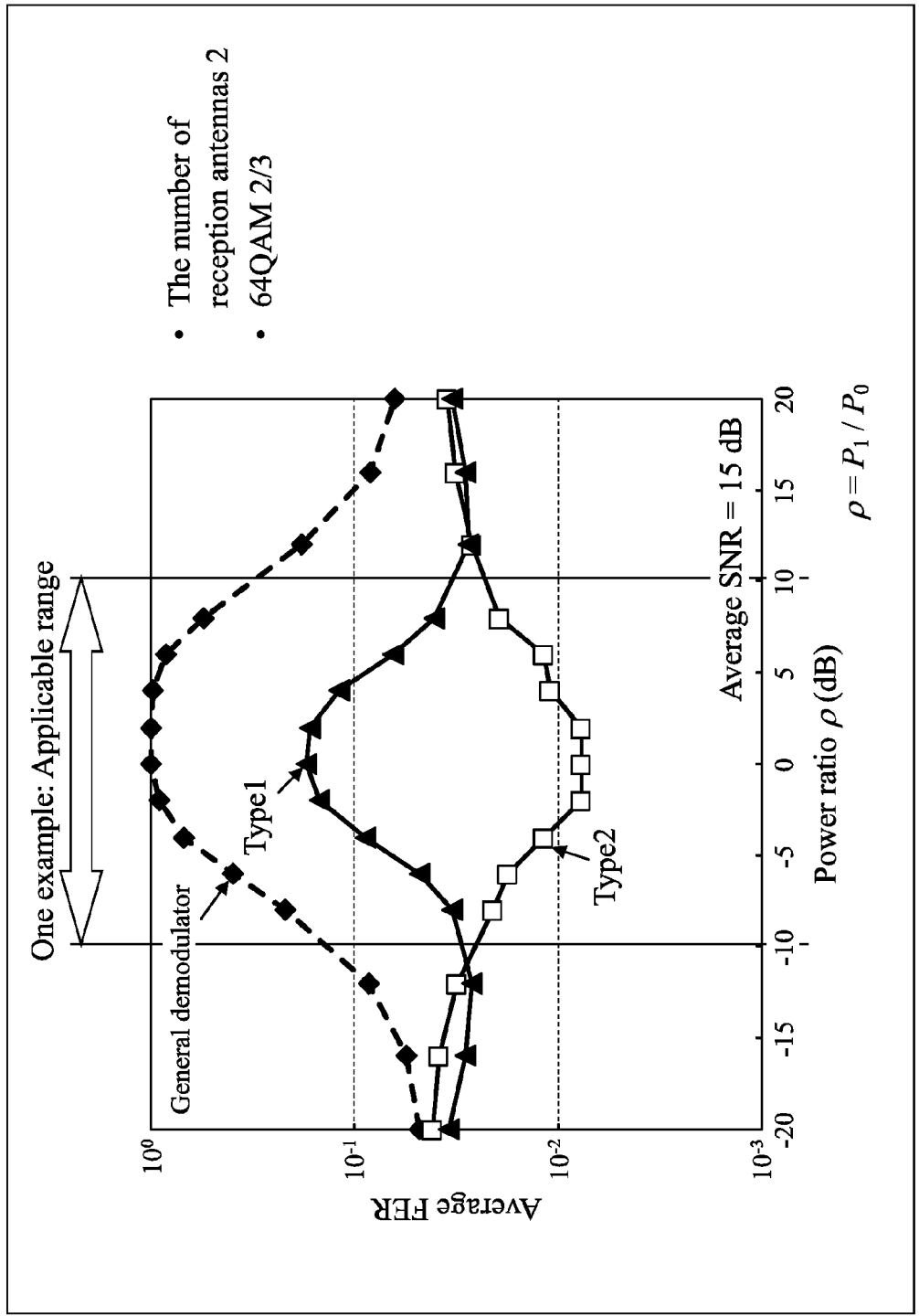
FIG. 4 is a graph showing a characteristic example in the case of reception with a demodulator having normal characteristics (a general demodulator) and a characteristic example in the case of demodulation using two types (Type 1, 2) of demodulators dealing with a repeater, in which the horizontal axis indicates a power ratio between the signals C1 and C2 while the vertical axis indicates an average FER.

FIG. 4 shows characteristic examples serving as reference to the above. In the characteristic examples shown in FIG. 4, the horizontal axis indicates a power ratio between the signals C1 and C2 and the vertical axis indicates a frame error ratio (Average FER). As for the characteristics, the drawing shows a characteristic example in the case of reception with a normal demodulator (a general demodulator) and characteristic examples in the case of demodulation using two types (Type 1, 2) of demodulators dealing with a repeater.

FIG. 4 is the view showing the examples in which synchronization, propagation path estimation, and the like are ideally known. As for such ideal characteristics, the characteristics obtained by using the demodulators dealing with multiple signal groups are always better than the characteristics of the normal demodulator in both of the cases of Type 1 and Type 2 as shown in FIG. 4. The drawing shows the case of applying the number of reception antennas equal to 2, and 64 QAM 2/3.

However, in reality, when the synchronization, the propagation path, and the like include errors, the demodulator dealing with multiple signal groups repeats processing for generating replicas based on the result of propagation path estimation whereby the errors may be accumulated. In the case of use including non-ideal errors such as an actual commercial receiver, the characteristics of the demodulator dealing with multiple signal groups may become worse in a region where the power difference is large.

Meanwhile, as another factor, the demodulator dealing with multiple signal groups has disadvantages of large power consumption and development of calculation delays. In view of these points, one conceivable threshold benchmark is to use the demodulator dealing with a repeater (dealing with multiple signal groups) in a range in FIG. 4 where |C1−C2| [is equal to or smaller than] 10 dB (one example: an applicable range) and to use the normal demodulator where |C1−C2| [is greater than] 10 dB, for example.

While the threshold may be determined fixedly depending on the power difference between the signals C1 and C2, such as 10 dB used in the above-described example, the threshold may also be variable depending on accuracy required by the reception signal (required reception C/N) and on reception performances of a terminal (a single signal group demodulator, the demodulator dealing with multiple signal groups) as shown in the graph. To be more precise, there are a modulation index, an error correcting capability, a tolerable error rate, a spatial multiplex number, a variation speed of the propagation path, a method of an internal arithmetic circuit, the number of processing bits, and so forth. It is also effective to change to optimize this threshold by use of any of these values. In short, no matter how may signal groups are detected, the control is executed as to whether the reception processing as the single signal group from the single transmitting station is carried out or the signal processing as the multiple signal groups from the multiple transmitting stations is carried out by considering the obtained characteristics, the power consumption, and the calculation delays.

As for other determination methods, there are also methods of performing determination by using the following means besides using the propagation characteristics of the received signal groups as described above:

(1) a method of causing the repeater to generate a different signal and to notify the presence using the signal;

(2) a method of notification from the base station; and (3) a method of visually determining presence of a repeater, or more specifically, a method of causing a user to press a button on the terminal or causing application software to perform switching, for example.

The above-described method (1) is available when the repeater has a function to add a signal apart from a function to amplify and transmit a base station signal. This method includes a method of adding an out-of-band subcarrier using the same communication mode, superposing a different signal on the original signal in the same band frequency, and so forth.

As for the above-described method (2), since an uplink signal to be transmitted from the terminal to the base station is also routed through the repeater and allowed to reach directly, there is provided a method of causing the base station to determine a delay as well as signal conditions thereof, and achieving determination by performing notification of communication through the repeater as information to be included in information bits or control bits transmitted from the base station to each terminal.

As for the above-described method (3), when a small-sized repeater or the like is a target, it is also conceivable that indication of a repeater area may be found in restaurant premises or inside a bullet train, for example. This is a determination method of causing a user to recognize that the user is located in the repeater area in this case and to switch a user interface of a terminal to an indoor repeater mode and the like. The terminal may also be configured to perform determination automatically by using a certain signal informing that the terminal is located in the repeater area.

The above description has been given of the case where the single repeater is provided and there are the two signal groups of C1 and C2. However, the present invention is also applicable to a case where there are two or more signal groups due to (three or more) signals being routed through multiple repeaters as used in an actual operation, due to multihop (in which a radio wave having been routed through a repeater is further routed through another repeater and is hence delayed by two stages), and so forth. When there are three signal groups, for example, it is possible to decide whether one of the signal groups is selected, two of them are used for processing, or all of the three are used for the processing by means of the function of a multiple transmitting station determination unit. In that case, synchronization timings also become one, two, or three accordingly.

Moreover, although the description is given of the case of generating the synchronization timing independently, it is also possible to generate delayed timings inside the demodulator dealing with a repeater based on a single timing.

For example, when a standard value of an amount of delay of a used repeater is known to be n microseconds, for example, it is possible to generate +n microseconds and +2n microseconds based on the single synchronization timing.

Next, actions of the multiple reception control unit 17 will be described. The multiple reception control unit 17 controls the actual demodulation processing upon receipt of the determination concerning whether it is appropriate to perform the processing on one, two, three or more signal groups, which is determined by the multiple signal group determination unit 15.

The processing selector 7 causes a normal processing system to execute the demodulation processing when the multiple signal group determination unit 15 decides the demodulation processing for a single signal group.

On the other hand, in the case of the processing for multiple signal groups, the processing selector 7 performs selection so as to cause the demodulator 21 dealing with multiple signal groups to execute the demodulation processing. In the case of multiple processing, a processing parameter for the demodulator 21 dealing with multiple signal groups is set depending on the number (2, 3, and so forth) of the signal groups to be processed. In the above-described MD-TE receiver, a set of the division number corresponds thereto.

By separating the processing as described above, normal reception processing may be performed when the processing for a single transmission system is sufficient. Hence it is possible to achieve low power consumption without necessitating extra operations of a repeat processing circuit and the like. In addition, it is also conceivable that this configuration achieves better reception performances when there is only one signal group in the first place. On the other hand, when the processing for multiple transmission systems is performed, favorable characteristics can be obtained by performing the processing with the demodulator 21 dealing with multiple signal groups. As described above, the embodiment of the present invention has an advantage of a capability of performing the optimum demodulation processing corresponding to the signals when the base station wave and the signal groups from repeater stations and the like come by.

In addition, it is also effective to control the following processing in conformity to the selection between the processing for a single signal group and the processing for multiple signal groups:

(1) operation clock control;
(2) synchronization control;
(3) gain calculation control;
(4) the demodulator dealing with a repeater;
(5) reception S/N calculation control (MCS control);
(6) antenna control; and
(7) display control.

These control operations will be described below.

Regarding (1) operation clock control: When the demodulator 21 dealing with multiple signal groups includes repeat processing and causes many operation delays, such operation delays occur accordingly when operation clock is constant. Therefore, the operation delays can be reduced by setting the operation clock so as to correspond to the required number of repetition. For example, when the number of times of repeat processing by the demodulator 21 dealing with multiple signal groups is five times relative to an operating speed of the normal processing system, it is possible to set the operation delays substantially equal by setting the operating speed five times as fast as a speed at the time of processing for a single transmission signal, and thereby to prevent a delay in an output of a decoded signal.

Regarding (2) synchronization control: This is used for control of the synchronization processing. Originally, the outcome of the synchronization circuit is used to determine whether a transmission signal includes a single signal group or multiple signal groups. However, other factors may also be added upon the determination as described previously. Hence the number of transmission of the synchronization timing signals can be accurately set by using a final determination result.

Regarding (3) gain calculation control: In a normal receiver, a reception signal maintains a signal level of a demodulation system constant by gain control of a variable gain amplifier. When the gain of the reception variable gain amplifier is controlled based on an amplitude of a subcarrier after FFT processing of the OFDM as a signal used for gain calculation, the control is performed in such a manner as to change the optimum amplitude depending on the presence and the number of multiple processing signals. For example, assuming that a control reception amplitude in the case of a single transmitting station signal is A, a control reception amplitude is k1A in the case of two transmitting station signals while a control reception amplitude is k2A in the case of three transmitting station signals, and so forth.

For instance, since FIG. 3(a) shows the single transmitting station signal, the reception signal consists of the signal C1. Accordingly, amplitude control of this signal by using an amplitude component coming out of a FFT unit after processing is equivalent to control of the amplitude of the reception signal. As for a reason for performing the control based on the amplitude of the FFT unit, there is an aim to calculate with the optimum number of bits as the FFT performs a large amount of calculation.

Meanwhile, the reception signal is equivalent to C1+C2 in FIG. 3(b) because the signal includes the multiple transmitting station signals. Here, when the multipath is divided in accordance with the method shown in FIG. 2, the FFT processing unit processes only the components of the respective signals C1 and C2. Therefore, the control based on this amplitude causes a problem because the amplitude of the reception signal becomes greater than the former amplitude. Accordingly, it is necessary to perform the amplitude control in consideration of the processing after the division in order to receive the multiple transmission signals and to equalize the signals with the single reception signal. That is, assuming that a control amplitude value is A in the case of receiving the signal transmitting station, a control amplitude value of the FFT unit is multiplied by a coefficient k1 in the case of receiving two of the multiple transmitting stations in order to change the control amplitude value in conformity therewith so that a combined amplitude becomes equal. Meanwhile, when the number of the multiple transmitting stations increases, a coefficient k2 and the like apply in conformity therewith.

Regarding (4) the demodulator dealing with a repeater: Optimum values are provided in terms of parameters that can be set to the demodulator 21 dealing with multiple signal groups. While the settable parameters vary depending on the processing method applied to the demodulator dealing with a repeater, the parameters include the number of multiple stations processable, a level difference between the respective signals, the number of times of repetition, and the like. As for the number of repetition, operating time is equal to the product of the above-described adjusted clock and the number of times of repetition.

Regarding (5) reception S/N calculation control (MCS control): When the signals from the multiple stations are demodulated, it may be inappropriate to determine a MCS value (modulation and error of adaptive modulation) by calculating reception S/N only by use of S/N at an input end of the reception system. In the example of FIG. 4, S/N is equal to 15 dB in every case. However, the error ratio in the case of the single transmitting station and the error ratios in Type 1 and Type 2 having the different modes of demodulation dealing with multiple signal groups are all different. In other words, required characteristics might not be obtained if the S/N at the input end of the reception system and the MCS value determined corresponding thereto are used on the premise of the demodulation of the single station. That is, performances may be improved by calculating equivalent S/N or setting up the optimum MCS corresponding to the number of the multiple stations, power ratios thereof, and processing performances of the demodulator dealing with a repeater.

Regarding (6) antenna control: When the reception system performs reception with multiple antennas and provides directionality by performing weighted combination, such weighting for aligning the directionality with a direction from which the largest power comes in may be acceptable in the case of the single signal group system. However, in the case of the multiple signal groups, two signal groups may come from different directions. Accordingly, it is preferable to align the directionality with the signal C1 and the signal C2 separately. Thus it is effective to obtain parameters for directionality control in consideration of the number of multiple signal groups and power of the respective signal groups.

Regarding (7) display control: when a mobile terminal or the like is provided with a display unit, control is performed for displaying whether the radio waves are received from a single station, multiple stations or how many stations. It is effective to notify a user of stability of a reception performance of the terminal by notification with this display and to display conditions of the number of received stations when the user is switching a mode to the repeater area by means of the method of visual determination as described above, and so forth.

Meanwhile, using a cellular telephone as another application example of display, performances vary as shown in FIG. 4 in the case of composite power from multiple stations even through the power is strong and a high power level is displayed. The control is also effective in this case. Specifically, a cellular telephone today often indicates the reception power as a state of reception by using the number of reception bars. Here, in the example of FIG. 4, an error ratio becomes large even when the state of reception is S/N=15 dB unless the demodulator is compatible (the general demodulator in the drawing). Therefore, it is possible to give an impression of a bad state of reception to the user by displaying more reception bars in the case of a compatible receiver while displaying less reception bars in the case of a non-compatible receiver. Naturally, the mode of expression is not limited to the number of bars and other visual expressions are similarly applicable. Specifically, the state of display may be changed corresponding to performances after demodulation and decoding instead of the simple index of the reception power.

The descriptions have been made above by explicitly separating the normal demodulator and the demodulator dealing with a repeater into different structures in FIG. 1 in order to clarify the descriptions. However, many portions are shared in terms of internal structures of actual devices (such as circuits). For example, the FFT, the interleaver, the error correction unit and the like correspond to such portions. Therefore, the gist of the present invention is not impaired and a similar effect can be obtained by a circuit configuration in which the two demodulators share some of circuits or are combined together as long as the above-described case of the processing for a single signal group and the case of the processing for multiple signal groups are functionally distinguished from each other. Hence such a configuration is also included in the scope of the present invention.

Meanwhile, all the descriptions so far have been made entirely according to the OFDM method. However, it is not always necessary to apply the OFDM method. That is, the invention is adaptable to another method as long as the method has different performances by executing different demodulation processing between the case of receiving a single signal group and the case of receiving multiple signal groups.

Second Embodiment

Next, a case of performing control on the subcarrier basis or the subcarrier block basis instead of subjecting all the reception signals to the same processing in the case of the OFDMA where the processing is separated by the frequency blocks will be described as a second embodiment of the present invention.

Figure 5:
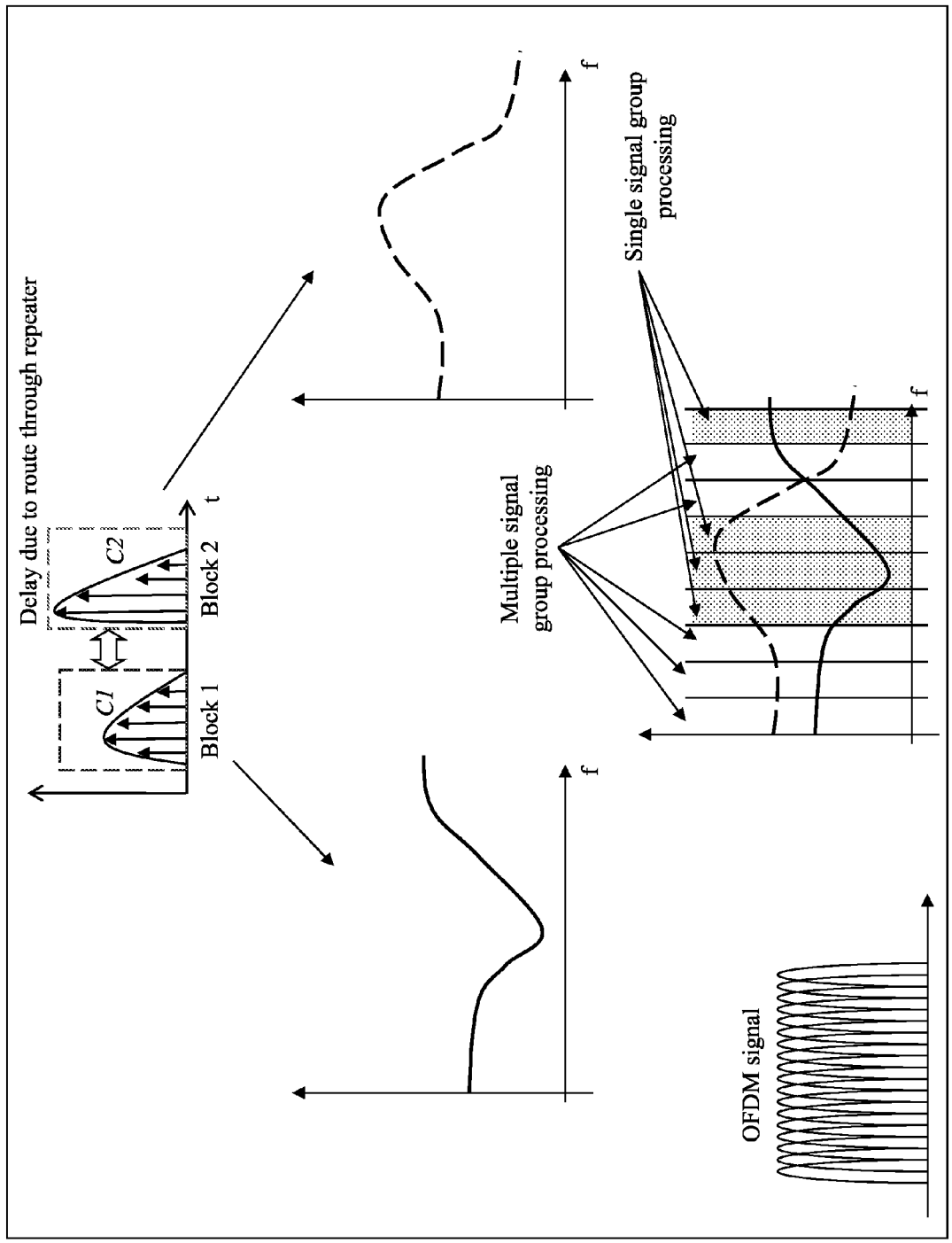
FIG. 5 is a view of the principle of propagation characteristics including frequency response.

FIG. 5 is a view of the principle of propagation characteristics including frequency response. Signals C1 and C2 in the drawing are not only delayed temporally but also routed through different paths, and are therefore deemed to represent independent propagation characteristics. Accordingly, the signals also exhibit different characteristics on the frequency axis. FIG. 5 shows frequency characteristic models of the signals C1 and C2 by indicating the frequency on the horizontal axis (graphs in a middle section).

The signals C1 and C2 may have the same average power but may partially generate a large power difference depending on the frequency. For this reason, when this difference is equal to or greater than 10 dB, for example, it may be appropriate to regard the signals rather as a signal equivalent to a single station upon receipt of a subcarrier that corresponds to the band frequency. A further increase in the difference between these two average power factors leads to an increase in the number of subcarriers having large power differences as well as an increase in the regions where the signals can be regarded as coming from a single station.

Figure 6:
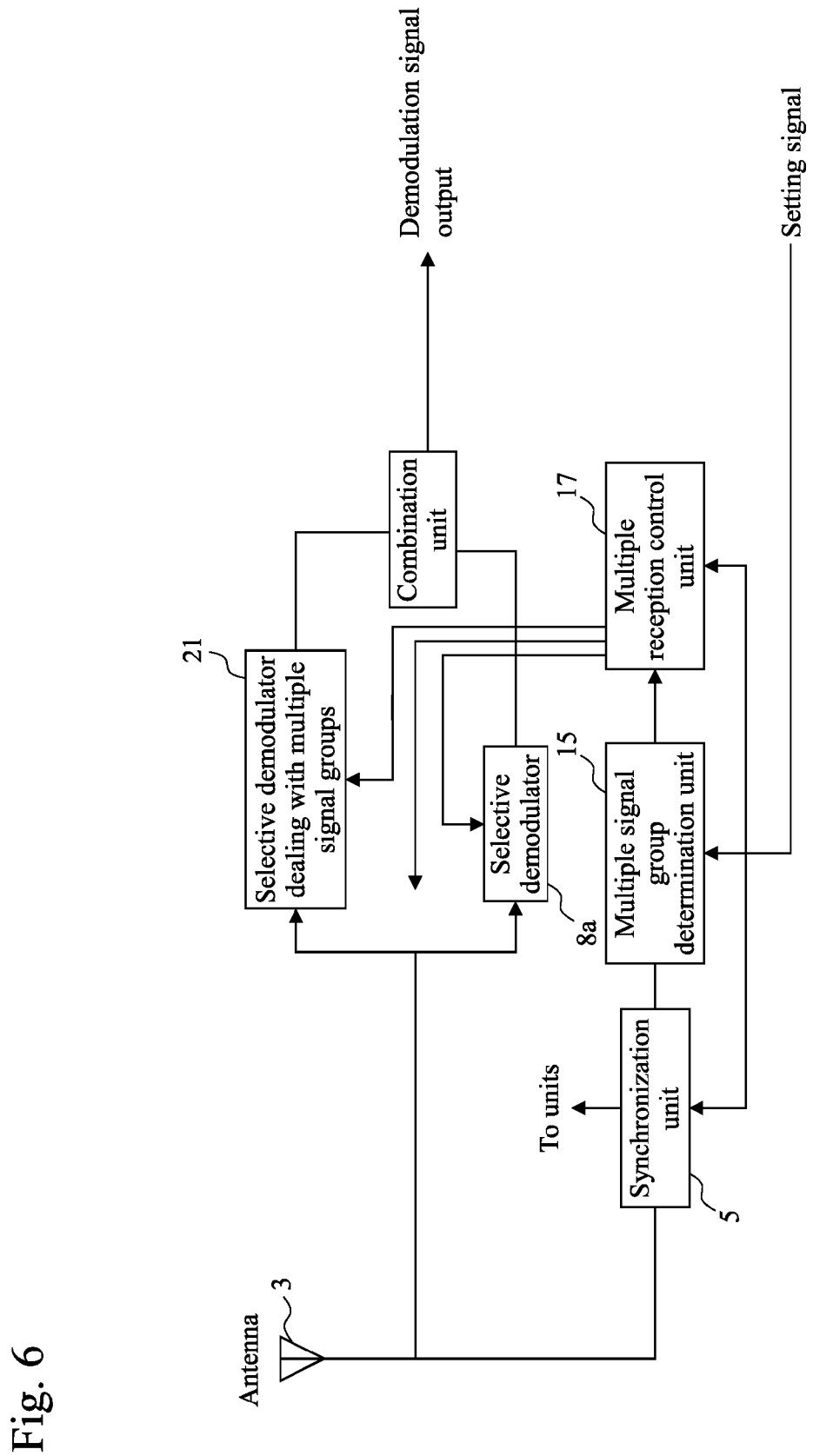
FIG. 6 is a view corresponding to FIG. 1, which is the view showing an example of a structure in which both of demodulators (a selective demodulator 8 and a selective demodulator 21 dealing with multiple signal groups) are configured to demodulate a subcarrier selectively.
Figure 7:
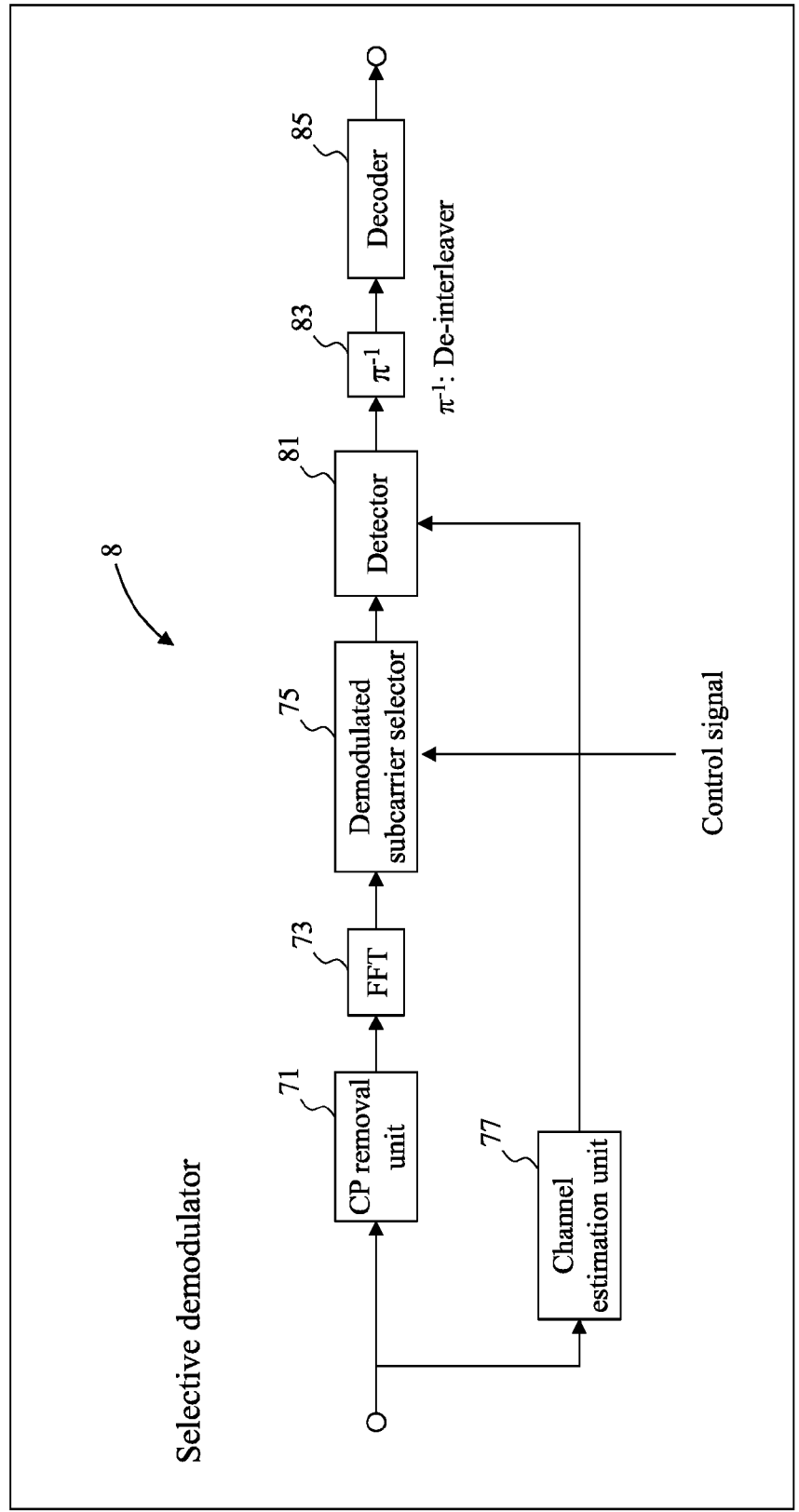
FIG. 7 is a view showing an example of an internal structure of the selective demodulator in FIG. 6.

In the example shown in FIG. 5, the discrimination between single and multiple stations based on the power difference is controlled by the OFDMA block (a lower section in FIG. 5). The lower section of FIG. 5 shows an example in which shadowed frequency regions are regarded as being composed of a single signal group and are subjected to demodulation accordingly while frequency regions without shadows are processed as multiple signal groups. In other words, the band frequencies to be switched between the selective demodulators can be switched depending on the frequency band in terms of either the entire band frequencies to be demodulated or part of the band frequencies to be demodulated, i.e., by the frequency region. Processing circuits at this time are shown in FIGS. 6, 7, and 8. The configuration shown in FIG. 6 is different from the first embodiment (FIG. 1) in that both of demodulators (a selective demodulator 8 and a demodulator 21 dealing with multiple signal groups) are configured to demodulate subcarriers selectively. The processing selector 7 in FIG. 1 is not provided. Therefore, the signals received by the antenna are inputted to the demodulator 21 dealing with multiple signal groups and to the selective demodulator 8a.

A multiple reception control unit notifies the selective demodulator and the demodulator dealing with multiple signal groups as to whether a subcarrier block is a subcarrier block supposed to be regarded as a single signal group and to be demodulated accordingly or the subcarrier block is a subcarrier block supposed to be regarded as multiple signal groups and to be demodulated accordingly.

As shown in FIG. 5, the signals marked for the single signal group processing are processed by the selective demodulator while the signals marked for the multiple signal group processing are processed by the demodulator dealing with multiple signal groups.

Thereafter, a demodulation result which is combined together by a combination unit and separately processed is outputted as a demodulation signal.

Respective examples of internal structures of the selective demodulator 8 and the demodulator 21 dealing with multiple signal groups are shown in FIG. 7 and FIG. 8. As shown in FIG. 7, in the selective demodulator 8, an output from a CP removal unit 71 is subjected to FFT processing by a FFT unit 73. All the subcarriers are processed so far. Thereafter, a subcarrier block selected to be demodulated based on a control signal is selected by a demodulated subcarrier selector 75. The selected subcarrier is demodulated by a detector 81 based on an estimation result by a channel estimation unit 77. A result thereof is outputted from the detector 81, and is outputted to and decoded by a decoder 85 through a de-interleaver 83. As a consequence, the signals marked for the single signal processing as shown in FIG. 5 are demodulated, decoded, and outputted.

Meanwhile, as shown in FIG. 8, the demodulator 21 dealing with multiple signal groups includes a multipath division unit 101, a MMSE (minimum mean square error) detector 135, a de-interleaver 137, a decoder 139, and a channel estimation unit 121. The multipath division unit 101 includes groups 0 to $N_B-1$ each including a convolution unit 103 for multipath and replicas excluding 0 block, an adder 105, a CP removal unit 107, a FFT 109, and a selector 111 to receive a subcarrier selection signal and to select a subcarrier based on the signal. The channel estimation unit 121 and the MMSE detector 135 perform channel estimation and MMSE upon receipt of outputs from the groups 0 to $N_B-1$.

In this case as well, regarding divided signals (the signals C1 and C2 in FIG. 3) out of the received signals, all the subcarrier signals are processed as FFT outputs. Thereafter, only the subcarriers suitable for the multiple signal group processing are selected.

There are also provided an adder 133 to add an output from the de-interleaver 137 and an output from the decoder 139 (a LLR of a coded bit), an interleaver 131 to receive an output therefrom, a converter 127 from the LLR into a modulation signal, an IFFT 125, and a CP insertion unit 123. An output from the CP insertion unit 123 is outputted to the convolution unit 103 for multipath and replicas excluding 0 block in each of the groups 0 to $N_B-1$ of the multipath division unit 101.

In this case as well, the replicas that need to be generated are only the signals to be demodulated. Accordingly, the replicas of the subcarriers suitable for the multiple signal group processing are generated.

As described above, the signals suitable for the single signal group processing are processed by the selective demodulator while the signals suitable for the multiple signal group processing are processed by the demodulator dealing with multiple signal groups, by the subcarrier block in any of these cases.

Note that the two subcarriers to be selected basically establish an exclusive relationship with each other. However, there is no problem even when the subcarriers overlap each other. Accordingly, it is also possible to demodulate the subcarriers in a partially overlapping manner or in the entirety and to use a selected or added result when combining demodulated signals.

Figure 9A:
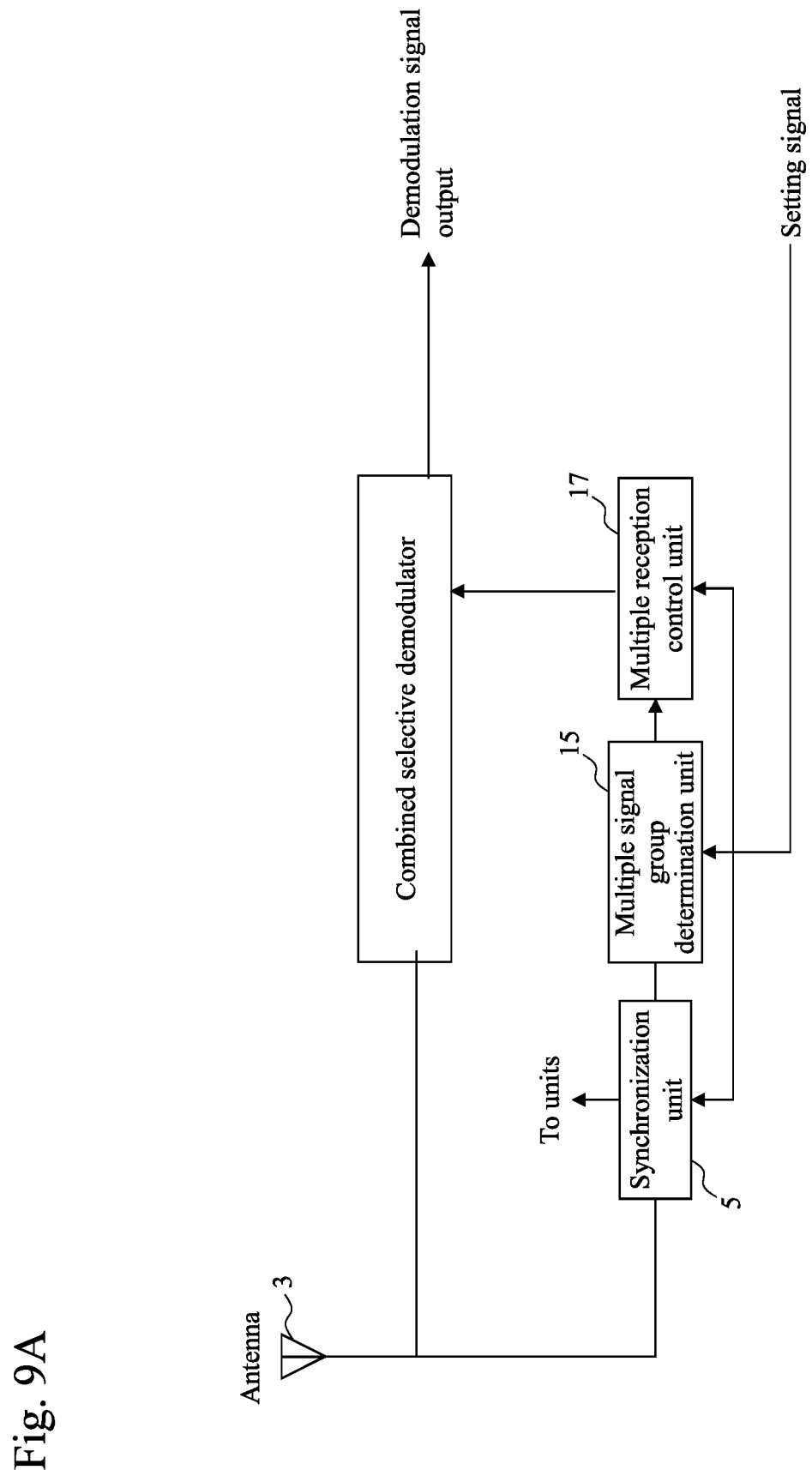
FIG. 9A is a view showing an example of a circuit in the circuit shown in FIG. 8, which can select the subcarrier when a detector, error correction (decoder), and the like are not completed therein.

Next, an example of a more flexible structure that is different from FIG. 8 will be described with reference to FIGS. 9A and 9B. A difference between the structure shown in FIG. 6 and the structure shown in FIG. 9A is as follows. Specifically, in FIG. 6, the selected subcarrier blocks are assumed to be highly independent and are processed by the selective demodulator and the selective demodulator dealing with multiple signal groups which are provided separately. Meanwhile, in FIG. 9A, only a part of circuits are used for selecting the subcarriers. In order to achieve combination as the output of the demodulation signal, the signal needs to be completed in the subcarrier block and error correction needs to be completed.

Figure 9B:
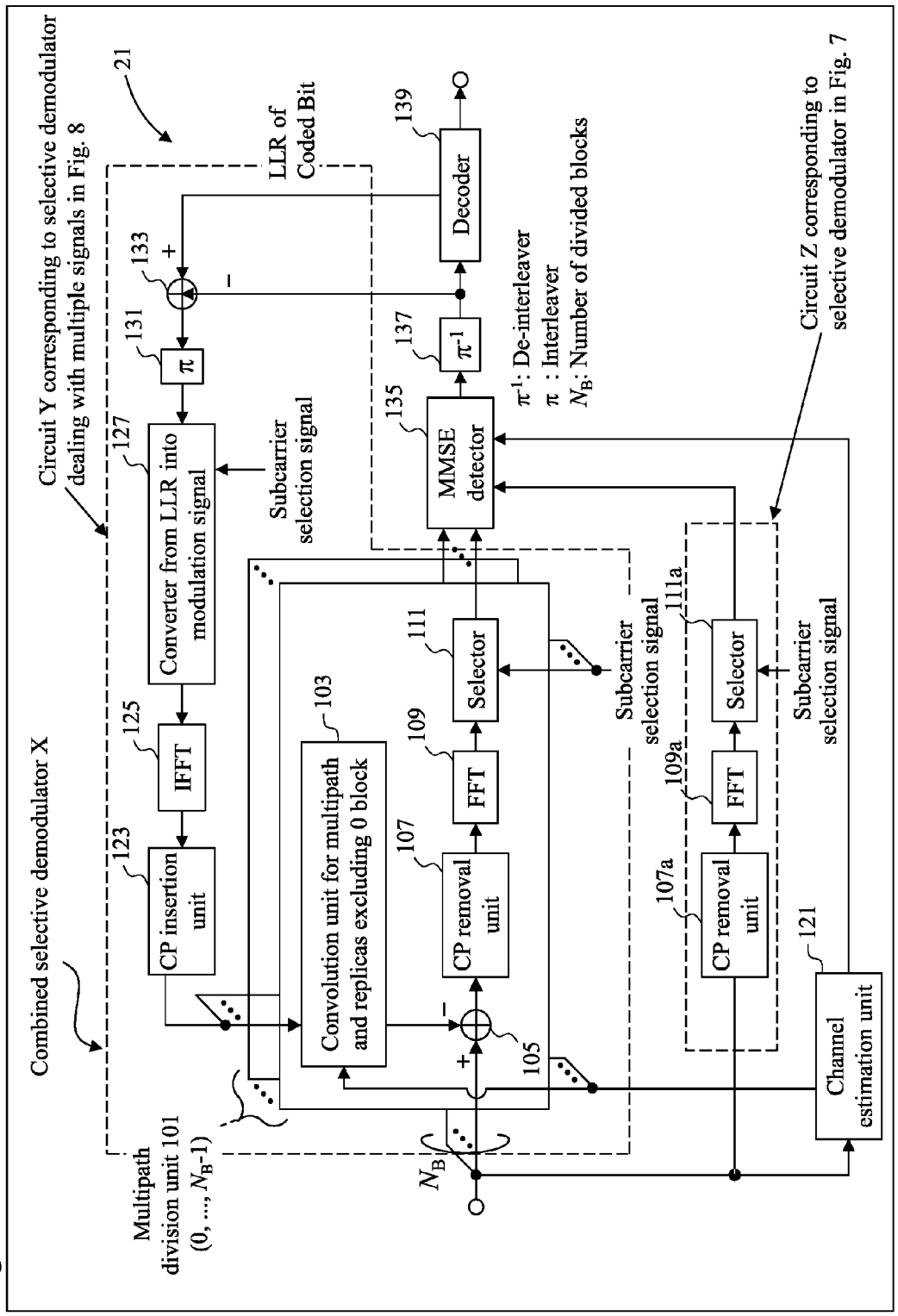
FIG. 9B shows an example of a circuit which can select the subcarrier when the detector, the error correction (decoder), and the like are not completed therein.

Meanwhile, a circuit shown in FIG. 9B is a circuit which can select the subcarrier when the detector, the error correction (decoder), and the like are not completed therein. Specifically, a CP removal unit 107a, a FFT 109a, and a selector 111a constitute a portion (Z) corresponding to the selective demodulator in FIG. 7 and handle the single signal group processing.

In the meantime, an upper portion enclosed by a dotted line is a processing portion (Y) corresponding to the selective demodulator dealing with multiple signal groups in FIG. 8. The detectors, the interleavers, and the decoders which perform the processing separately in FIG. 7 and FIG. 8 are shared herein. In the structure of FIG. 6, the selected subcarrier block is separately processed down to the decoder. Therefore, the error correction of the selected subcarrier block also needs to be completed in each unit of processing. For example, when the entire band frequency is formed into ten basic subcarrier blocks at the time of generating transmission signals and each block is subjected to completed error correction, the configuration in FIG. 6 enables section at the level of the basic blocks but does not enable further subdivision.

On the other hand, in the structure of FIG. 9A, the decoding processing takes place after the combination. Accordingly, the decoding processing is not affected by the mode of division. As a result, the subcarrier blocks defined by the sender of the basic blocks do not constitute a limitation upon selection. Hence it is possible to select any unit of subcarriers. In this way, the subcarrier block being selected does not have to be completed. Thus the optimum demodulation method can be selected anywhere in the subcarriers and the degree of freedom is thereby improved.

Figure 10:
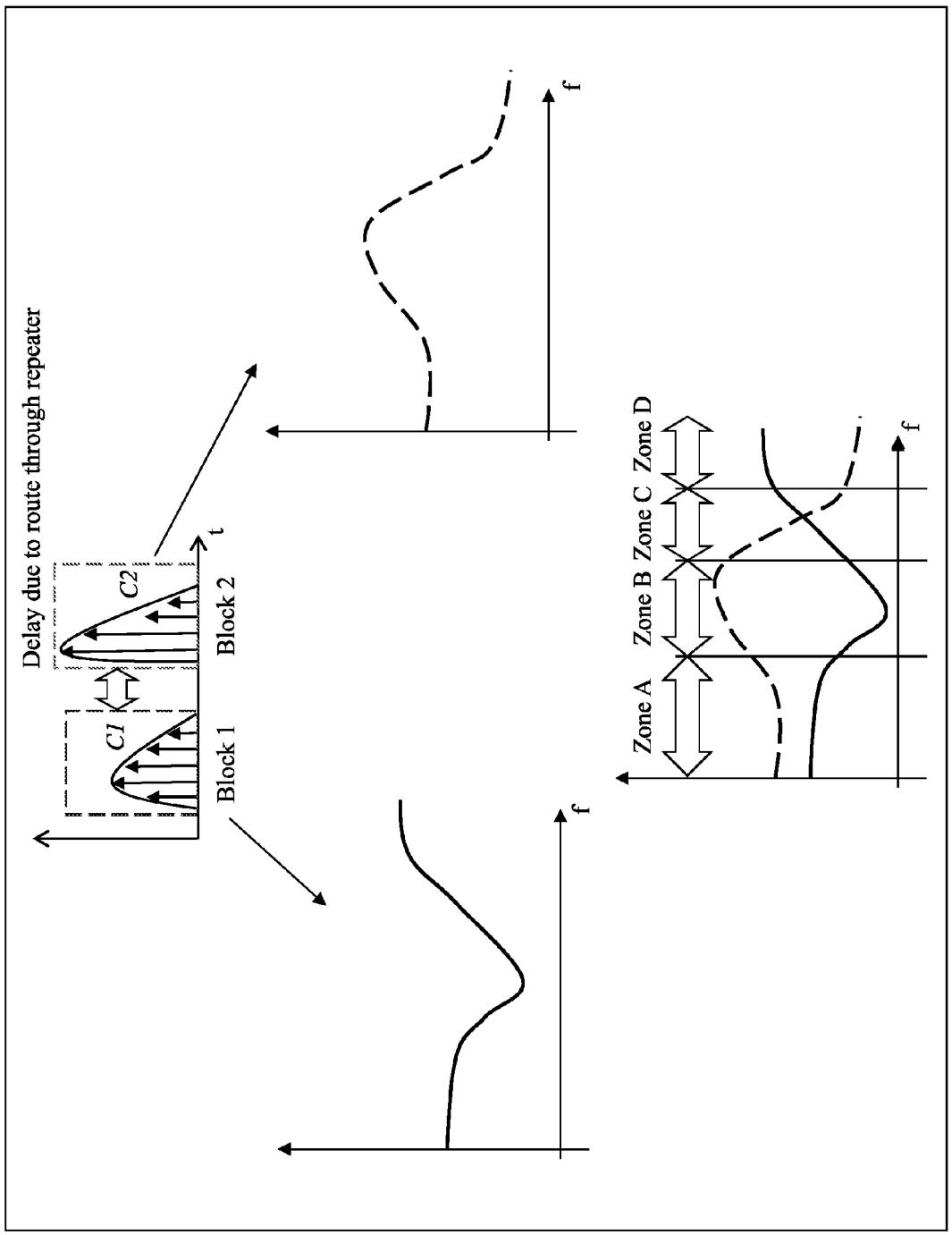
FIG. 10 is a view of the principle of propagation characteristics including frequency response in the circuit configurations shown in FIG. 9A and FIG. 9B.

An aspect in this case will be described with reference to FIG. 10.

FIG. 5 is the view showing that the entire band frequency is formed into nine basic subcarrier blocks. Selection between the single signal group processing and the multiple signal group processing is also made in terms of each of the nine blocks. Hence there is a selectional restriction.

On the other hand, according to the circuit of FIG. 9, selection between the single signal group processing and the multiple signal group processing does not always have to be made by the basic blocks and an arbitrary unit of the subcarrier blocks can be selected instead. Therefore, it is possible to perform selection based on a magnitude relation between two signals as shown in FIG. 10.

In the drawing, the signal C2 is strong but has a small difference from the signal C1 in a zone A and the signals are processed as the multiple signal groups. In zone B, the signal C2 is strong and can therefore be processed as the single signal group. In a zone C, the signals C1 and C2 are almost equal and are therefore processed as the multiple signal groups. In a zone D, the signal C1 is strong and is therefore processed as the single signal group. Meanwhile, the respective zones are restricted by the basic block sizes unlike the case in FIG. 5.

As described above, lower power consumption and higher performances can be realized by selecting appropriate processing between the single signal group processing and the multiple signal group processing part by part as shown in FIG. 6 and FIG. 9.

The embodiments so far have described the concrete circuit configuration examples (connection examples) in the selective demodulator dealing with a repeater using the MD-TE. It is of course possible to deal similarly with the case of using other methods of selective demodulation dealing with a repeater.

Figure 11:
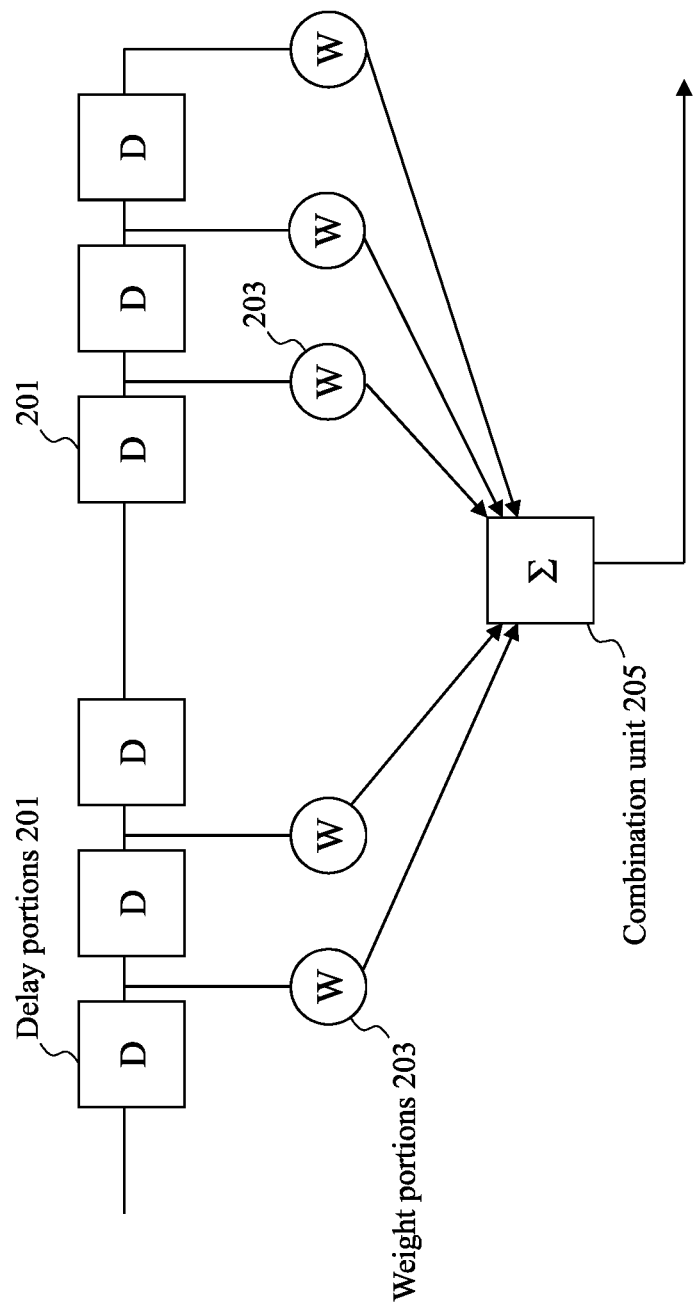
FIG. 11 is a view showing an example of channel shortening (a linear equalization method).

An example of channel shortening (a linear equalization method) is shown in FIG. 11 as a reference example. In this case, multiple signal groups are gathered and compressed in terms of time by forming temporal delays D201 as taps and applying weights W203 to the taps and combining the taps together with a combination unit (sigma) 205. The above-described circuit configuration is also effective for demodulating the multiple signal groups which are temporally spread out. Meanwhile, when the multiple signal groups are spread out in three or more pieces, the multiple signal groups can be handled by setting the delay taps equal to temporal lengths thereof. In this way, effects equivalent to those shown in FIGS. 1, 2, and 6 can be obtained in terms of other demodulators dealing with multiple signal groups.

Figure 12:
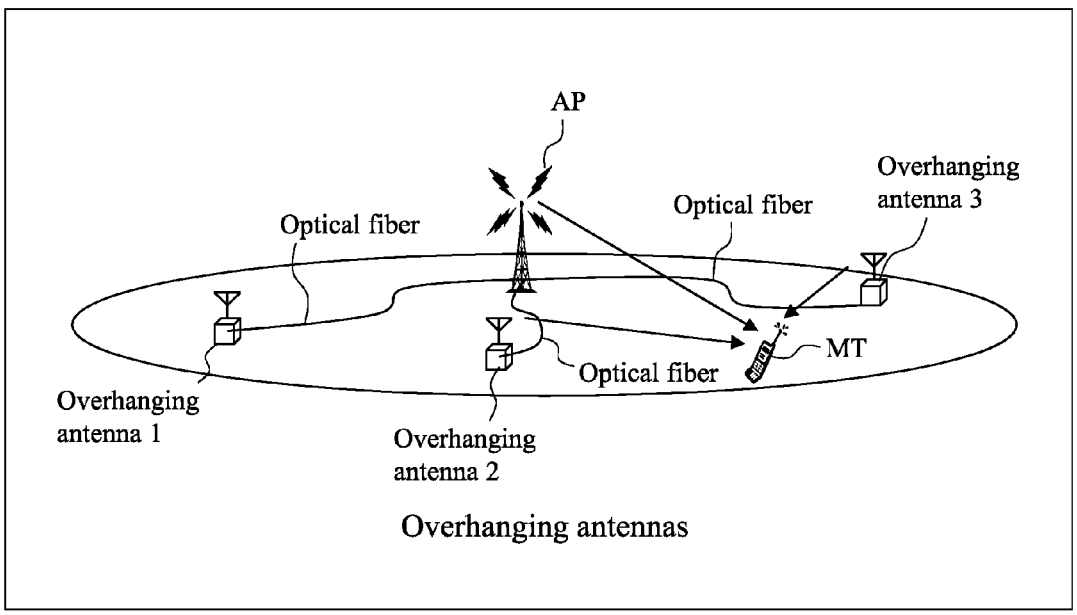
FIG. 12 is a view showing an example of a system configuration using overhanging antennas, which is the view showing the configuration to connect a base station to the overhanging antennas by use of wires (such as optical fibers).

The above-described embodiments have shown the examples in which the signal groups are divided into C1 and C2, for instance, due to the delay caused by the repeater. Now, an example of division into the signal groups due to another reason will be described. FIG. 12 is a view showing an example of a system configuration using so-called overhanging antennas. The aforementioned repeater is configured to amplify and send out the incoming radio waves, whereas this system is configured to connect a base station AP to overhanging antennas 1 to 3 by use of wires (such as optical fibers). A mobile station MT communicates with the base station AT or an overhanging antenna. In this configuration as well, identical signals are received with a delay therebetween as similar to the case of the repeater and reception signals become similar to the reception signals from the multiple transmitting stations as shown in FIG. 2 as a consequence. The present invention is also applicable to this configuration.

Figure 13:
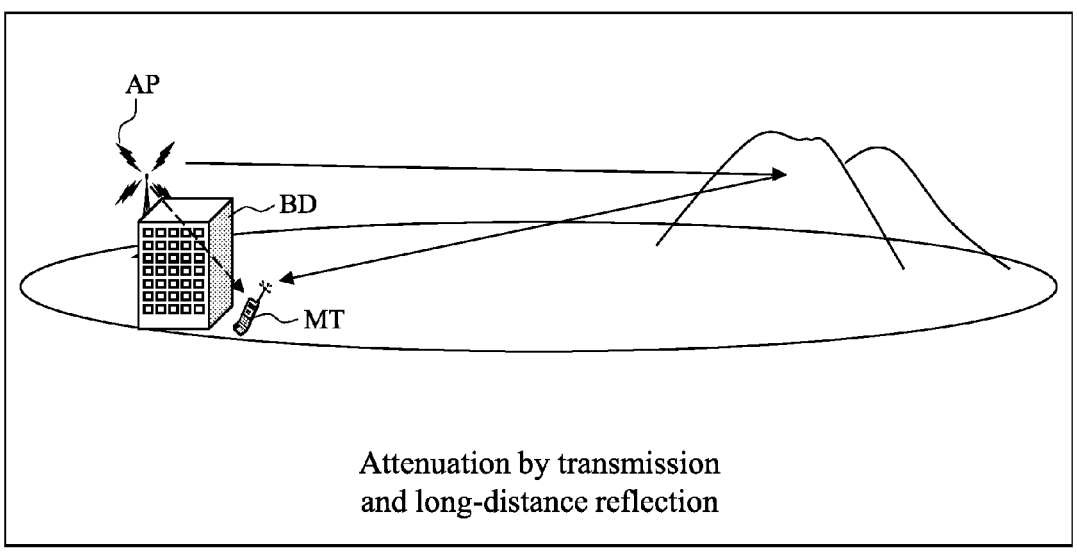
FIG. 13 shows a case where a signal from a nearby base station (AP) reaches after being subjected to transmission attenuation by a building BD or the like while a long-distance reflected wave reflected by a remote mountain or the like is received by a terminal MT, whereby identical signals become signals to be received with a delay.

FIG. 13 shows a case where a signal from a nearby base station (AP) comes in after undergoing transmission attenuation attributed to a building BD or the like while a long-distance reflected wave reflected by a remote mountain or the like is received a terminal MT. Again, identical signals are changed into signals to be received with a delay therebetween as similar to the reception signals shown in FIG. 2. In this case, a multiple transmission determination unit regards the signals as equivalent to the multiple transmission based on propagation characteristics thereof and will perform the similar processing.

As described above, according to the embodiments of the present invention, in reception processing where a single signal group and multiple signal groups are mixed depending on a use environment and a propagation condition, signals can be optimally received by determining whether it is appropriate to operate a reception system as reception of the single signal group or as reception of the multiple signal groups, and performing control as well as different demodulation processing. Therefore, it is possible to provide a receiver which can perform appropriate reception under various circumstances, and thereby to improve operation performances including a reception performance, power consumption, a processing delay, and so forth.

The above-described embodiments are not limited only to the configurations and other features as illustrated in the accompanying drawings and modifications are possible as appropriate within the scope where the effects of the present invention can be obtained. In addition, the embodiments can be modified as appropriate insofar as they do not depart from the scope of the present invention.

Moreover, all the descriptions have been made here in accordance with the OFDM method. However, without limitation to the OFDM method, similar effects can be obtained by applying the invention to any multicarrier method configured to simultaneously communicate multiple non-orthogonal signals that can be processed by dividing a frequency band into blocks Meanwhile, the processing of the respective units may be realized by recording a program for realizing the functions described in the embodiments in a computer-readable recording medium and causing a computer system to read and execute the program recorded in this recording medium. Note that the "computer system" stated herein includes an OS, an execution program, and hardware such as a CPU, a DSP or a peripheral device.

Moreover, when a WWW system is used, the "computer system" is assumed to include a home page providing environment (or display environment) as well.

Meanwhile, the "computer-readable recording medium" means a portable medium such as a flexible disk, a magneto-optical disk, a ROM or a CD-ROM, and a recording medium such as a ROM, a RAM, or a hard disk to be incorporated in the computer system. Furthermore, the "computer-readable recording medium" also includes one that dynamically holds a program for a short period of time such as a communication line in the case of transmission of the program through a network such as the Internet or through a telecommunication line such as a telephone line, one that rewrites an internal rewritable ROM, and one that holds the program, for a certain period of time in that case such as a volatile memory in the computer system serving as a server or a client. In addition, the program may be configured to realize part of the above-described functions and to realize the above-described functions in combination with a program stored in the computer system in advance.

INDUSTRIAL APPLICABILITY

The present invention is applicable to communication apparatuses.

It is to be understood that all the publications, patents, and patent applications cited in this specification are entirely incorporated in this specification by reference.

The invention claimed is:

1. A receiver in a communication system provided with one transmitting station or two or more transmitting stations and the receiver for reception from the transmitting stations, the receiver characterized in that:
   for a case where identical signals are sent from the one transmitting station or the two or more transmitting stations, the receiver comprises:
   a first demodulator configured to execute demodulation processing of the signals as a single signal group and a second demodulator configured to execute demodulation processing of the signals as multiple signal groups;
   a determination unit configured to discriminate between the single signal group and the multiple signal groups; and
   a control unit configured to control which one of the first demodulator and the second demodulator is to execute the demodulation processing based on a determination result by the determination unit.

2. A receiver in a communication system provided with one transmitting station or two or more transmitting stations and the receiver for reception from the transmitting stations, the receiver characterized in that
   for a case where identical signals are sent from the one transmitting station or the two or more transmitting stations, the receiver comprises:
   a determination unit configured to discriminate between a single signal group and multiple signal groups;
   a demodulator configured to execute demodulation processing of any of the signal groups; and
   a control unit configured to control which of first demodulation processing and second demodulation processing to execute by the demodulator based on a determination result by the determination unit, the first demodulation processing being for demodulating the signals as the single signal group, the second demodulation processing being for demodulating the signals as the multiple signal groups.

3. A receiver in a communication system provided with one transmitting station or two or more transmitting stations and the receiver for reception from the transmitting stations, the receiver characterized in that
   for a case where identical signals are sent from the one transmitting station or the two or more transmitting stations and are separable and distinguishable as multiple signal groups including two or more groups by a reception system based on a difference in arrival time, the receiver comprises:
   a first demodulator configured to execute demodulation processing of the signals as a single signal group in the reception system;
   a second demodulator configured to execute demodulation processing of the signals as multiple signal groups separable based on the difference in arrival time;
   a determination unit configured to determine whether received signals are the single signal group or the multiple signal groups separable and distinguishable based on the difference in arrival time;
   a control unit configured to control which one of the first demodulator and the second demodulator is to execute the demodulation processing based on a determination result by the determination unit; and
   a selective demodulator configured to switch between reception of the single signal group and reception of the multiple signal groups depending on a state of reception.

4. A receiver in a communication system provided with one transmitting station or two or more transmitting stations and the receiver for reception from the transmitting stations, the receiver characterized in that
   for a case where identical signals are sent from the one transmitting station or the two or more transmitting stations and are separable and distinguishable as signal groups including two or more groups by a reception system based on a difference in arrival time, the receiver comprises:
   a determination unit configured to determine whether received signals are a single signal group or multiple signal groups separable and distinguishable based on the difference in arrival time;
   a control unit configured to control which one of first demodulation processing and or second demodulation processing to execute on the basis of a determination result by the determination unit, the first demodulation processing being for demodulating the signals as the single signal group in the reception system, the second demodulation processing being for demodulating the signals as the multiple signal groups separable based on the difference in arrival time; and
   a selective demodulator configured to switch between reception of the single signal group and reception of the multiple signal groups depending on a state of reception.

5. The receiver according to claim 1, characterized in that the receiver switches between reception of the single signal group and reception of the multiple signal groups for two or more signals as radio waves of identical signals transmitted in such a way that the two or more transmitting stations includes one transmitting station and at least one repeater configured to relay a transmission signal received from the transmitting station, and that the at least one repeater amplifies and transmits the received signal.

6. The receiver according to claim 1, characterized in that the demodulator capable of performing separate demodulation processing with two or more frequency regions into which a demodulation band frequency for the demodulator is divided is configured to be capable of switching between reception of the single signal group and reception of the multiple signal groups based in units of the frequency regions.

7. The receiver according to claim 6, characterized in that in a case where a transmission signal includes a transmission signal dividable by frequency, the receiver switches the demodulation band frequency in units of the frequency division processing of the transmission signal.

8. The receiver according to claim 6, characterized in that the receiver switches the frequency division processing based in units of frequency division processing of OFDMA in communication using an OFDMA method.

9. The receiver according to claim 6, characterized in that the receiver switches the demodulation band frequency based in units of processing of one signal including error correction.

10. The receiver according to claim 1, characterized in that the determination unit measures an incoming received signal group, compares the reception single group with a preset threshold, and determines whether the received signal group is a single transmission group or multiple transmission groups.

11. The receiver according to claim 10, characterized in that
the threshold is set depending on a modulation method used by a transmission signal.

12. The receiver according to claim 10, characterized in that
the threshold is set depending on demodulation performances of reception of the single signal group and reception of the multiple signal groups by a reception circuit.

13. The receiver according to claim 10, characterized in that
the threshold is set depending on demodulation performances of reception of the single signal group and reception of the multiple signal groups by a reception circuit and on a demodulation performance of the receiver in motion.

14. The receiver according to claim 1, characterized in that
in a case where the two or more transmitting stations include one transmitting station and a repeater and transmit two or more identical signals in such a way that the repeater amplifies and transmits a received signal,
the repeater adds, as an additional signal, a signal enabling discrimination between the identical signals, and
the receiver discriminates between a single transmission group and multiple transmission groups based on whether or not the signal enabling determination is received.

15. The receiver according to claim 14, characterized in that
the receiver has a function to receive the additional signal transmitted at least in any of a different band frequency and a different communication method from those of a relayed signal.

16. The receiver according to claim 14, characterized in that
the receiver has a function to receive the additional signal multiplexed on the same frequency band as a relayed signal.

17. The receiver according to claim 14, characterized in that
the receiver has a function to receive the additional signal transmitted while being added to outside of a frequency band of a relayed signal by the same demodulation method.

18. The receiver according to claim 1, characterized in that
the determination unit performs determination based on a signal added as information data on the signal from the transmitting station.

19. The receiver according to claim 1, characterized in that
the determination unit performs determination by using a signal from an application layer.

20. The receiver according to claim 19, characterized in that
the switching is performed by recognizing an input of a signal generated by the application layer as a user interface.

21. The receiver according to claim 1, characterized in that
the control unit performs switching control of the demodulation processing between reception of the single signal group and reception of the multiple signal groups and sets a processing parameter and an operation parameter.

22. The receiver according to claim 21, characterized in that
the control unit performs control by switching an operation clock used for the demodulation processing depending on a demodulation mode of any of reception of the single signal group and reception of the multiple signal groups.

23. The receiver according to claim 21, characterized in that
the control unit controls a synchronization unit used for the demodulation processing of any of reception of the single signal group and reception of the multiple signal groups and transmits synchronization signals that are different between reception of the single signal group and reception of the multiple signal groups.

24. The receiver according to claim 21, characterized in that
the control unit controls a gain calculation unit used for the demodulation processing of any of reception of the single signal group and reception of the multiple signal groups depending on a demodulation mode.

25. The receiver according to claim 21, characterized in that
the control unit performs calculation while switching reception quality depending on a demodulation mode in response to the switching control of the demodulation processing.

26. The receiver according to claim 21, characterized in that
the control unit performs calculation while switching modulation information to be notified to the transmitting station, the modulation information including a modulation mode and a code rate, depending on a demodulation mode in response to the switching control of the demodulation processing.

27. The receiver according to claim 21, characterized in that
the control unit performs control while switching an antenna synthesis circuit depending on a demodulation mode in response to the switching control of the demodulation processing.

28. The receiver according to claim 21, characterized in that
the control unit inputs information corresponding to a demodulation mode as information provided to an application layer.

29. A receiving method in a communication system provided with one transmitting station or two or more transmitting stations and a receiver for reception from the transmitting stations, the method characterized by comprising, for a case where identical signals are sent from the one transmitting station or the two or more transmitting stations:
a determining step of discriminating between a single signal group and multiple signal groups; and
a step of controlling which one of a first demodulating step and a second demodulating step to execute, on the basis of a determination result in the determining step, the first demodulating step being for demodulating the signals as a single signal group, the second demodulating step being for demodulating the signals as multiple signal groups.

* * * * *